United States Patent
Watanabe et al.

(10) Patent No.: US 9,780,562 B2
(45) Date of Patent: Oct. 3, 2017

(54) METHOD AND SYSTEM FOR POWER SYSTEM STABILIZATION USING PREDICTION CONFIDENCE BASED ON HIGH-FREQUENCY COMPONENTS OF POWER COMMAND VALUE

(71) Applicant: Panasonic Corporation, Osaka (JP)

(72) Inventors: Kenichi Watanabe, Osaka (JP); Seiya Miyazaki, Hyogo (JP); Takahiro Kudoh, Kyoto (JP); Yutaka Yamamoto, Kyoto (JP); Masaaki Nagahara, Kyoto (JP); Gou Nishida, Kyoto (JP)

(73) Assignee: PANASONIC CORPORATION, Osaka (JP)

( * ) Notice: Subject to any disclaimer, the term of this patent is extended or adjusted under 35 U.S.C. 154(b) by 81 days.

(21) Appl. No.: 14/878,533

(22) Filed: Oct. 8, 2015

(65) Prior Publication Data
US 2016/0028234 A1    Jan. 28, 2016

Related U.S. Application Data

(63) Continuation of application No. PCT/JP2014/003529, filed on Jul. 2, 2014.

(30) Foreign Application Priority Data

Aug. 8, 2013  (JP) ................. 2013-165091

(51) Int. Cl.
*H02J 3/12* (2006.01)
*H02J 3/00* (2006.01)
(Continued)

(52) U.S. Cl.
CPC ............... *H02J 3/12* (2013.01); *G05B 15/02* (2013.01); *H02J 3/00* (2013.01); *H02J 3/14* (2013.01);
(Continued)

(58) Field of Classification Search
None
See application file for complete search history.

(56) References Cited

U.S. PATENT DOCUMENTS

2009/0216387 A1*  8/2009  Klein ................. H02J 3/14
                                                          700/296

FOREIGN PATENT DOCUMENTS

| JP | 9-267283 | 10/1997 |
| JP | 2009-142107 | 6/2009 |
| JP | 2009-219315 | 9/2009 |

OTHER PUBLICATIONS

International Search Report of PCT application No. PCT/JP2014/003529 dated Aug. 12, 2014.

\* cited by examiner

*Primary Examiner* — Mohammad Ali
*Assistant Examiner* — Saad M Kabir
(74) *Attorney, Agent, or Firm* — Greenblum & Bernstein, P.L.C.

(57) ABSTRACT

A power system stabilization method includes: receiving a power command value from a power control center that monitors a power system; transmitting the power command value to a power supply device; causing the power supply device to supply power to the power system according to the power command value; generating a prediction command value according to past power command values received from the power control center, the prediction command value being a prediction value of a power command value to be transmitted from the power control center next after the power command value; transmitting the prediction command value to a power supply device; causing the power supply device to supply power to the power system according to the power prediction command value; receiving the next power command value from the power control center;

(Continued)

ATMOSPHERIC TEMPERATURE = 30°C

| HIGH-FREQUENCY COMPONENTS OF POWER COMMAND VALUE | FIRST STANDBY TIME |
|---|---|
| FEW | SHORT |
| MEDIUM | MEDIUM |
| MANY | LONG | transmitting the next power command value to the power supply device.

10 Claims, 11 Drawing Sheets

(51) Int. Cl.
*H02J 3/14* (2006.01)
*H02J 3/24* (2006.01)
*H02J 3/32* (2006.01)
*H02J 13/00* (2006.01)
*G05B 15/02* (2006.01)

(52) U.S. Cl.
CPC ................................ *H02J 3/24* (2013.01); *H02J 3/32* (2013.01); *H02J 13/0079* (2013.01); *H02J 2003/003* (2013.01); *Y02B 70/3225* (2013.01); *Y04S 10/54* (2013.01); *Y04S 20/222* (2013.01)

FIG. 4

ATMOSPHERIC TEMPERATURE = 30°C

| HIGH-FREQUENCY COMPONENTS OF POWER COMMAND VALUE | FIRST STANDBY TIME |
|---|---|
| FEW | SHORT |
| MEDIUM | MEDIUM |
| MANY | LONG |

FIG. 8

|  | STANDBY TIME FOR (DISTRIBUTED) PREDICTION COMMAND VALUE | STANDBY TIME FOR (DISTRIBUTED) POWER COMMAND VALUE |
|---|---|---|
| ONE POWER SUPPLY DEVICE | FIRST STANDBY TIME | NONE (SECOND STANDBY TIME = 0) |
| TWO OR MORE POWER SUPPLY DEVICES | FIRST STANDBY TIME + SECOND STANDBY TIME | SECOND STANDBY TIME |

METHOD AND SYSTEM FOR POWER SYSTEM STABILIZATION USING PREDICTION CONFIDENCE BASED ON HIGH-FREQUENCY COMPONENTS OF POWER COMMAND VALUE

BACKGROUND

1. Technical Field

The present disclosure relates to a power system stabilization method that suitably maintains the power and frequency of a power system with an interconnected power supply device.

2. Description of the Related Art

In order to stabilize a power system, a power command value is transmitted to a power supply device connected to the power system from a management device that manages the power supply device, and the output power of the power supply device is controlled.

The power command value may be transmitted to the power supply device from the management device using an Internet link, for example, but in some cases a variable communication delay occurs between the management device and the power supply device, and it may not be possible to execute control at the originally desired control timings.

Accordingly, in the control system described in Japanese Unexamined Patent Application Publication No. 2009-219315 (Patent Literature 1), a management device generates a power command value for a generator in the power system, and a front-loaded control based on the power command value is conducted to thereby realize control at the originally desired control timings.

SUMMARY

There is room for improvement of the front-loaded control in the control system described in Patent Literature 1.

In light of the above circumstances, a non-limiting and exemplary embodiment provides a power system stabilization method that is improved over the related art.

The additional benefits and superiority of the disclosed embodiment is clear from the specification and the drawings. The above benefits and/or superiority are each given by the features disclosed in the various embodiments, specification, and drawings. Furthermore, not all of the above features disclosed in the various embodiments, specification, and drawings are required to obtain one or more of the above benefits and/or superiority.

A power system stabilization method according to one aspect of the present disclosure is a power system stabilization method includes: receiving a power command value from a power control center that monitors a power system; transmitting the power command value to a power supply device; causing the power supply device to supply power to the power system according to the power command value; generating a prediction command value according to past power command values received from the power control center, the prediction command value being a prediction value of a power command value to be transmitted from the power control center next after the power command value; transmitting the prediction command value to a power supply device; causing the power supply device to supply power to the power system according to the power prediction command value; receiving the next power command value from the power control center; transmitting the next power command value to the power supply device.

According to the present disclosure, a power system stabilization method that is improved over the related art is realized.

BRIEF DESCRIPTION OF THE DRAWINGS

FIG. 4 is a standby time chart for deciding a first standby time;

FIG. 8 is a chart illustrating relationships between the number of power supply devices and the standby times;

DETAILED DESCRIPTION

Underlying Knowledge Forming Basis of the Present Disclosure

The inventors obtained the following findings as a result of diligent investigation.

In the control system described in Patent Literature 1, since the power command value is generated by the management device, a power command value transmitted in advance may be recognized, and front-loading of the power command value may be realized. At this point, in the hypothetical case of a control system configured so that the management device executes control by receiving successive power command values from a power control center, there is a problem in that since the management device itself must wait for a power command value to arrive from the power control center, front-loaded control by the management device becomes difficult.

Accordingly, a power system stabilization method according to one aspect of the present disclosure is a power system stabilization method includes: receiving a power command value from a power control center that monitors a power system; transmitting the power command value to a power supply device; causing the power supply device to supply power to the power system according to the power command value; generating a prediction command value according to past power command values received from the power control center, the prediction command value being a prediction value of a power command value to be transmitted from the power control center next after the power command value; transmitting the prediction command value to a power supply device; causing the power supply device to supply power to the power system according to the power prediction command value; receiving the next power command value from the power control center; transmitting the next power command value to the power supply device.

According to such a configuration, front-loaded control may be executed in a power system stabilization method that supplies power from a power supply device to a power system on the basis of a power command value from a power control center.

<Configuration>

Since frequency control of the power system is conducted by power control, frequency control is a technology that encompasses the control of power values in a power system. For this reason, the description hereinafter will focus on the mechanism of frequency control.

Figure 1:
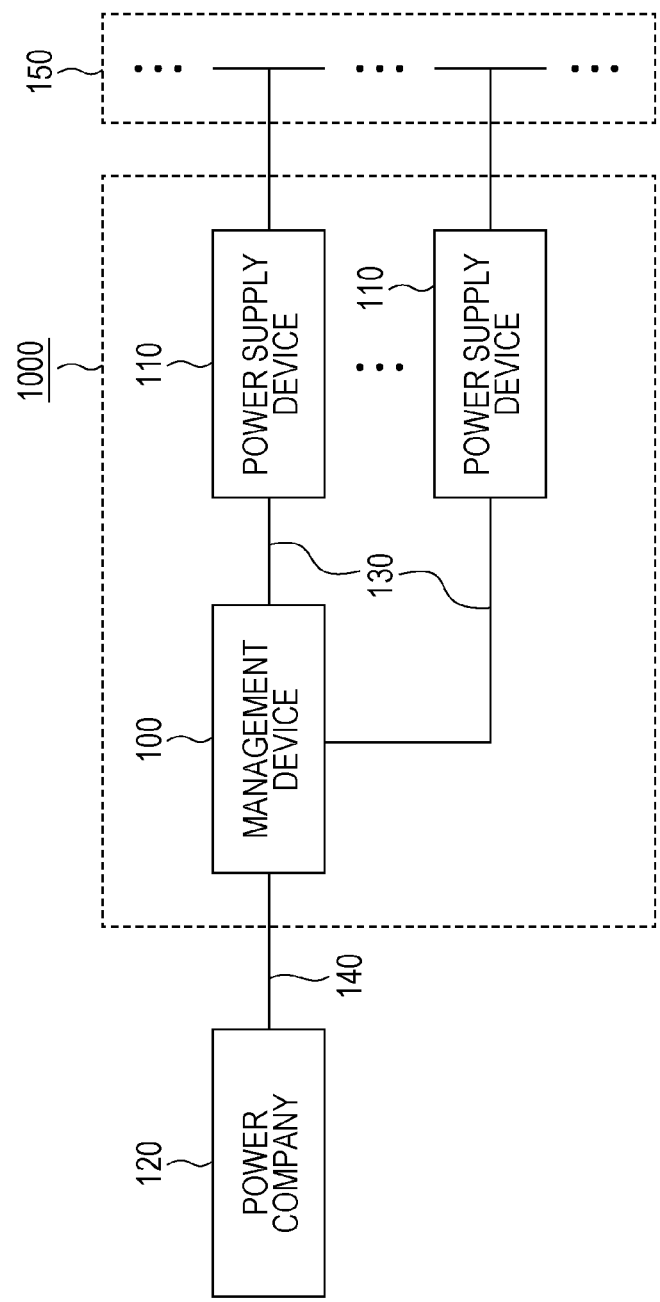
FIG. 1 is a system diagram illustrating a configuration of a power system stabilization system.

FIG. 1 is a system diagram illustrating a configuration of a power system stabilization system.

As illustrated in FIG. 1, the power system stabilization system 1000 is made up of a management device 100 and one or more power supply devices 110. The management device 100 is connected to a power company 120 via a dedicated link 140, and the management device 100 is connected to each power supply device 110 via a communication network 130. In addition, each power supply device 110 is connected to a power system 150. Although not illustrated in the drawings, loads such as electrical equipment in respective homes and system facilities, for example, are connected to the power system 150.

This utility power is power at a power frequency predetermined according to the region of usage. Generally, the power frequency is determined according to the rotational frequency of the generator (not illustrated) of the power company 120, and the size of the load connected to the power system 150. In other words, if the load connected to the power system 150 increases, the burden imposed on the generator becomes heavier, and thus the rotational frequency does down, and as a result, the power frequency falls. Conversely, when the load connected to the power system 150 is small, the burden on the generator becomes lighter, and thus the rotational frequency goes up, and as a result, the power frequency rises. Accordingly, the power frequency of the power system 150 is controlled to stay within a predetermined margin of error above and below the predetermined power frequency discussed above. This control is realized by the output (discharging) of power from the power supply devices 110 and the charging of the power supply devices 110. Note that in this example, the power company 120 is an example of a power control center (load dispatching center), but is not limited thereto. If power generation and distribution are separated, a power system operator may also fulfill the role of the power company 120. In other words, the power control center may also be a power generating company or a system operator. Additionally, the power control center may also be a power utility (service provider) or the like.

Although not illustrated in the drawings, the power company 120 successively receives detected power frequency information from a detector that detects the power frequency of the power system 150, and transmits a total power command value related to power control to the power supply devices 110 via the management device 100 as appropriate. In other words, when the power frequency rises, the management device 100 outputs a power command value for executing charging to the power supply devices 110, and when the power frequency falls, the management device 100 outputs a power command value for executing discharging.

The power command value is specified as a watt value, and the power supply devices 110 are configured to execute discharging if the power command value is a positive value, and execute charging if a negative value.

Consequently, the power company 120 periodically (for example, every 2 seconds) transmits a power command value to the management device 100. The power company 120 and the management device 100 are connected by the dedicated link 140. Note that for the sake of simplicity, the dedicated link 140 is assumed to produce little or no communication delay. Herein, producing little or no communication delay means that power control is unaffected during the operation of the system even if a communication delay is produced. In addition, the power company 120 may transmit an encoded power command value, or transmit the raw data as-is.

Note that although FIG. 1 illustrates multiple power supply devices 110, the following description is based on the case of single power supply device 110 being controlled by the management device 100.

Every time the management device 100 receives a power command value from the power company 120, the management device 100 transmits that power command value to the power supply device 110, and also generates a prediction command value predicting the next power command value after the received power command value. Subsequently, every time a prediction command value is generated, the generated prediction command value is transmitted to the power supply device 110.

The management device 100 will be discussed in detail later. Similarly to the power command value, the prediction command value is likewise specified as a watt value, and the power supply device 110 is configured to execute discharging if the prediction command value is a positive value, and execute charging if a negative value.

In the case of using a standby time, the management device 100 decides a first standby time in advance (for example, a time decided once each day). Herein, the first standby time is a delay time applied according to at least the confidence of the prediction command value versus the power command value. The delay time is decided in accordance with a trend of variation in the power command value calculated from factors such as past information (for example, statistical information about power demand based on changes such as the season, atmospheric temperature, weather, and holidays). For example, spectral analysis may be used to prepare data expressing the relevance between high-frequency components of the power command value and variation factors (such as the climate, atmospheric temperature, weather, and holidays), and the first standby time may be decided by determining whether or not the current conditions are conditions in which variation of the power command value may occur frequently. For specific variation factors, variation in units of seasons or months may be considered to be long-term variation, for example. Meanwhile, variation according to the weather or holidays may be patterned as daily variation.

Subsequently, the management device 100 transmits the decided first standby time to the power supply device 110. Note that the method of applying the first standby time in the operation of the power supply device 110 will be discussed later. In the case of controlling multiple power supply devices 110, the management device 100 additionally decides a second standby time. Herein, the second standby time is a transmission delay compensation time decided according to the maximum value of the transmission delay between the management device and each power supply device on the network. Note that the first standby time and the second standby time may be decided by advance calculation, or by successive calculations conducted in response to conditions.

Every time the management device 100 receives a power command value from the power company 120, the management device 100 transmits the received power command value to the power supply device 110. In addition, the management device 100 generates a prediction command value corresponding to the next power command value, and transmits the prediction command value to the power supply device 110. Note that in the case of controlling multiple power supply devices 110, every time the management device 100 receives a power command value from the power company 120, the management device 100 generates a distributed power command value, which is a command value of power to distribute to each power supply device 110. The management device 100 generates the distributed power command value from the power command value according to the characteristics of each power supply device 110 (such as the remaining level, degree of wear, and inverter loss, for example), and transmits the generated distributed power command value instead of the power command value. In addition, the management device 100 generates a prediction command value corresponding to the next power command value, generates a distributed prediction command value distributed according to the state of each power supply device 110 from the prediction command value, and transmits the distributed prediction command value to the power supply devices 110 instead of the prediction command value.

The advantageous effects of the distributed power command value and the distributed prediction command value will now be described. As discussed earlier, the distributed power command value and the distributed prediction command value are generated according to the characteristics of the power supply devices 110 (such as the remaining level, degree of wear, and inverter loss, for example). For this reason, when the distributed power command value and the distributed prediction command value are generated according to the degree of wear, for example, extending device lifespan becomes possible by decreasing the distributed power command value and the distributed prediction command value for a power supply device 110 with age-related wear, for example. As another example, realizing efficient power control becomes possible by generating the distributed power command value and the distributed prediction command value so that inverter loss is minimized overall, for example. Furthermore, when a power supply device 110 fails, it is possible to immediately redistribute the distributed power command value and distributed prediction command value distributed to that power supply device 110 to another power supply device 110. As a result, it becomes possible to prevent the power control from deviating largely from the originally desired power control.

Meanwhile, every time the power supply device 110 receives a power command value from the management device 100, the power supply device 110 conducts discharging or charging based on the power command value. Although the present embodiment describes as an example a case in which the power supply device 110 is a storage battery system, the power supply device 110 is not limited thereto. The power supply device 110 may also be a generator. The generator may be a fuel cell, flywheel, or the like, for example.

Also, every time the power supply device 110 receives a prediction command value from the management device 100, the power supply device 110 executes discharging or charging based on the prediction command value. The power supply device 110 will be discussed in detail later.

Figure 2:
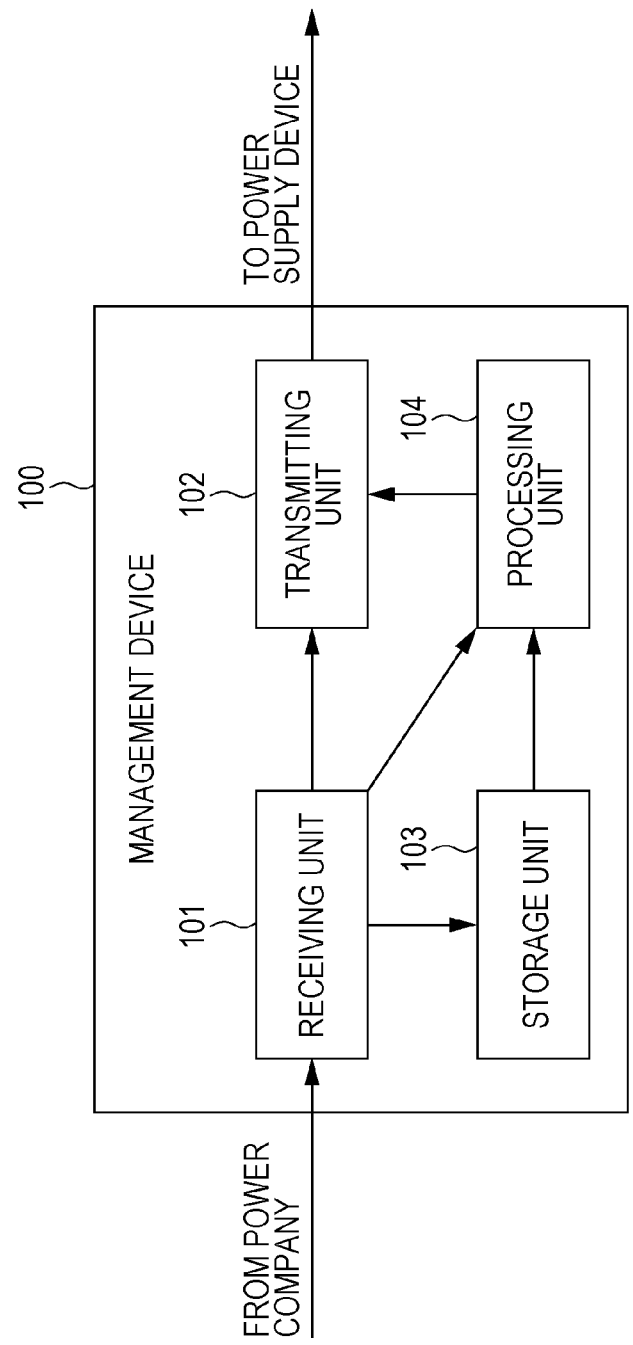
FIG. 2 is a function block diagram illustrating a functional configuration of a management device.

Next, FIG. 2 is a function block diagram illustrating a functional configuration of the management device 100. As illustrated in FIG. 2, the management device 100 is made up of a receiving unit 101, a transmitting unit 102, a storage unit 103, and a processing unit 104.

The receiving unit 101 receives the power command value from the power company 120 via the dedicated link 140, transmits the power command value to the transmitting unit 102, and records the received power command value in association with the time of receipt in the storage unit 103. Note that the receiving unit 101 may also include a function of notifying the processing unit 104 that the power command value was received (this is indicated by the dashed line in FIG. 2). In addition, the receiving unit 101 may also include a function of transmitting the received power command value to the processing unit 104.

The storage unit 103 is a recording medium that includes a function of storing a history of power command values that the management device 100 received in the past. The history stores power command values in association with the times when those power command values were received.

The processing unit 104 includes a function of reading out past power command values from the storage unit 103 and generating a prediction command value, which is a value predicting the power command value to be received next, on the cycle by which the receiving unit 101 receives the power command value. Furthermore, in the case of controlling multiple power supply devices 110, the processing unit 104 includes a function of generating a distributed prediction command value from the generated prediction command value. Furthermore, the processing unit 104 includes a function of generating the first standby time according to the prediction confidence.

Specifically, the processing unit 104 reads out a predetermined number of past power command values (for example, 10 values), including the power command value received by the receiving unit 101, and uses the predetermined number of power command values to predict the next power command value and generate the prediction command value. The prediction uses an autoregressive model, for example. Every time the processing unit 104 generates a prediction command value, the processing unit 104 transmits the generated prediction command value to the transmitting unit 102.

Furthermore, in the case of using a standby time, the processing unit 104 decides the first standby time according to the confidence of the prediction computed from changes in the power command value in advance, and transmits the first standby time to the transmitting unit 102. To decide the first standby time, for example, spectral analysis is used to prepare data expressing the relevance between high-frequency components of the power command value and variation factors (such as the climate, atmospheric temperature, weather, and holidays), and it is determined whether or not the current conditions are conditions in which variation of the power command value may occur frequently. The deciding of the first standby time will be discussed in detail later.

At this point, the case of the management device 100 controlling multiple power supply devices 110 will be described.

Every time the receiving unit 101 receives a power command value, the processing unit 104 generates, from the power command value, a distributed power command value distributed according to the characteristics of each power supply device 110 (such as the remaining level, degree of wear, and inverter loss, for example), and transmits the generated distributed power command value to the transmitting unit 102. In addition, the processing unit 104 generates, from the generated distributed power command value, a distributed prediction command value distributed according to the state of each power supply device 110, and transmits the generated distributed prediction command value to the transmitting unit 102.

Furthermore, in the case of using a standby time when controlling multiple power supply devices 110, the processing unit 104 decides the second standby time in advance, and transmits the decided second standby time to the transmitting unit 102. The second standby time is a transmission delay compensation time decided according to the maximum value of the transmission delay between the management device and each power supply device on the network.

In addition, the processing unit 104 includes a function of judging whether the management device 100 controls one power supply device 110 or multiple power supply devices 110. On the basis of this judgment, the execution or non-execution of the generation of the distributed power command value and the distributed prediction command value is decided. Note that this judgment may use any technique insofar as the processing unit 104 is able to recognize how many power supply devices 110 are to be controlled. For example, a flag indicating how many power supply devices 110 are to be controlled may be stored in the storage unit 103, and the judgment may be made by reading the flag. Alternatively, the judgment may be made from the number of respective pieces of status information (for example, battery level or state of health (SOH)) received from each power supply device 110.

Note that, as discussed earlier, it is not strictly necessary to calculate the first standby time and the second standby time in advance, and the processing unit 104 may also successively calculate the first standby time and the second standby time in response to conditions.

The transmitting unit 102 includes a function of transmitting the power command value to the power supply device 110 every time the transmitting unit 102 receives the power command value from the receiving unit 101. In addition, the transmitting unit 102 includes a function of transmitting the prediction command value to the power supply device 110 every time the transmitting unit 102 receives the prediction command value and the first standby time from the processing unit 104. When transmitting the power command value or prediction command value to the power supply device 110, the transmitting unit 102 encodes the power command value or prediction command value according to a communication protocol used on the communication network 130 in association with an identifier for distinguishing whether the information to transmit is the power command value or the prediction command value.

Furthermore, in the case of controlling multiple power supply devices 110, the transmitting unit 102 includes a function of transmitting the distributed prediction command value, the distributed power command value, and the second standby time.

Note that when the processing unit 104 calculates the standby time successively, the transmitting unit 102 may also transmit the prediction command value and the first standby time simultaneously. In other words, suppose that the prediction command value also includes information related to the time when the command value should be applied. In addition, suppose that the signal transmitted from the management device 100 to the power supply device 110 includes an identifier indicating that the transmitted signal is the power command value or the prediction command value, or alternatively, has a first standby time of 0. The first standby time and the second standby time may be transmitted using an arbitrary format insofar as the power supply device 110 is able to interpret the format as a numerical value expressing a delay time. Additionally, a prediction command value with a standby time already applied may also be considered.

Figure 3:
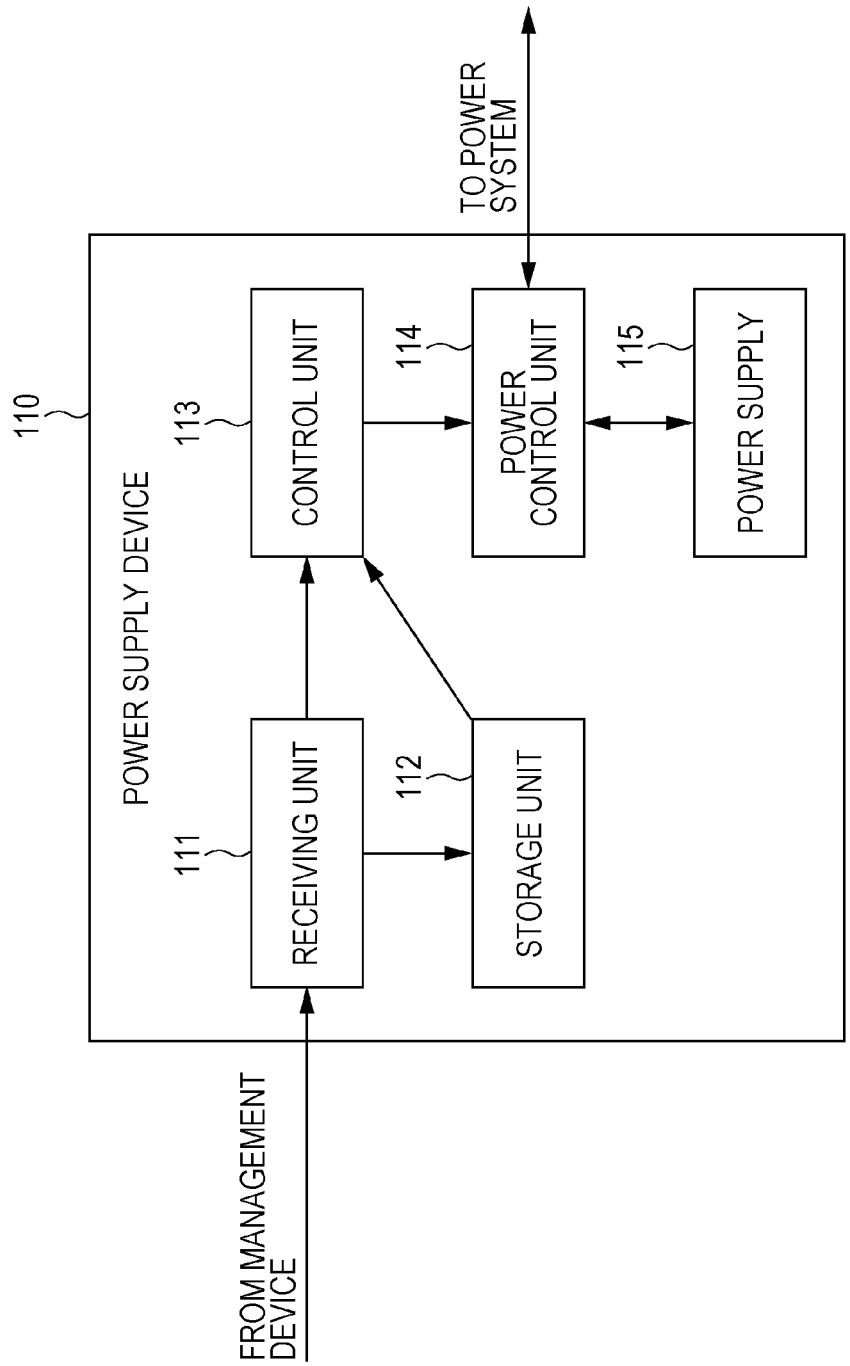
FIG. 3 is a function block diagram illustrating a functional configuration of a power supply device.

FIG. 3 is a function block diagram illustrating a functional configuration of the power supply device 110. As illustrated in FIG. 3, the power supply device 110 is equipped with a receiving unit 111, a storage unit 112, a control unit 113, a power control unit 114, and a power supply 115.

The receiving unit 111 includes a function of transmitting to the control unit 113 a power command value, prediction command value, distributed power command value, or distributed prediction command value obtained by demodulating a signal received from the management device 100. Also, when the receiving unit 111 receives a power command value, prediction command value, and standby time, the receiving unit 111 records the received information in association with the time of receipt in the storage unit 112.

The storage unit 112 is a recording medium that includes a function of storing a history of prediction command values and standby times that the power supply device 110 received in the past. The history stores prediction command values in association with the times when those prediction command values were received. Also, the storage unit 112 stores the first standby time for deciding the timing for starting power control based on the prediction command value. The first standby time will be discussed in detail later.

The control unit 113 includes a function of receiving the power command value or prediction command value and the standby time from the receiving unit 111, and giving power control instructions to the power control unit 114 based on the received information.

Specifically, when the control unit 113 receives the power command value from the receiving unit 111 and was not yet conducting power control based on the prediction command value, the control unit 113 transmits the power command value directly to the power control unit 114 and causes power control to be executed.

Also, when the control unit 113 receives the power command value and was conducting power control based on the prediction command value, after standing by for the second standby time, the control unit 113 immediately transmits the power command value to the power control unit 114 and causes power control to be executed. Note that in the case of the management device 100 controlling a single power supply device 110, the second standby time becomes 0 s.

When the control unit 113 receives the prediction command value, the control unit 113 stands by for the second standby time, stands by for the first standby time that determines how long to standby with the prediction command value until starting power control based on the prediction command value, and after that, transmits the prediction command value to the power control unit 114. Note that in the case of the management device 100 controlling a single power supply device 110, the second standby time becomes 0 s.

The power control unit 114 includes a function of charging the power supply 115 and discharging from the power supply 115 in accordance with an instruction from the control unit 113. Specifically, the power control unit 114 includes a power conditioner that converts AC power to DC power, and converts DC power to AC power. The power control unit 114 includes a function that, according to an instruction from the control unit 113, acquires a specified quantity of DC power from the power supply 115, converts the DC power to AC power, and discharges the AC power into the power system 150, and a function that receives AC power from the power system 150, converts the AC power to DC power, and charges the power supply 115.

The power supply 115 is a storage battery (DC power source) that executes the charging and discharging of power under control by the power control unit 114, and may be a lithium-ion battery, for example.

The foregoing thus describes a configuration of the power system stabilization system.

<Data>

FIG. 4 is a standby time chart that indicates the first standby time from when the power supply device 110 receives the prediction command value from the management device 100 until starting power control based on the prediction command value. Note that although the standby time chart is depicted qualitatively in FIG. 4, quantitative values are configured in the standby time chart in actual practice. As illustrated in FIG. 4, the standby time chart expresses the relevance between the high-frequency component of the power command value and variation factors (such as the climate, atmospheric temperature, weather, and holidays), and is a chart associating current conditions with standby times. In the standby time chart, a longer first standby time is configured for conditions in which variations of the power command value are predicted to occur frequently. This is because the case of many high-frequency components in the power command value indicates a large amount of sudden variation in the power command value, and in this case, there is a higher probability of incorrect prediction. For this reason, when there is a high probability of incorrect prediction, delaying the start of power control based on the prediction command value avoids large deviations from the originally desired power control. Conversely, in the case of few high-frequency components in the power command value, the variation in the power trend is monotonic, and thus there is a higher probability of correct prediction. For this reason, starting power control based on the prediction command value as early as possible enables the execution of power control that is close to the originally desired power control.

Note that the first standby time is configured to ensure that the execution of power control based on the prediction command value is started before the next control period starts.

<Operation>

Figure 5:
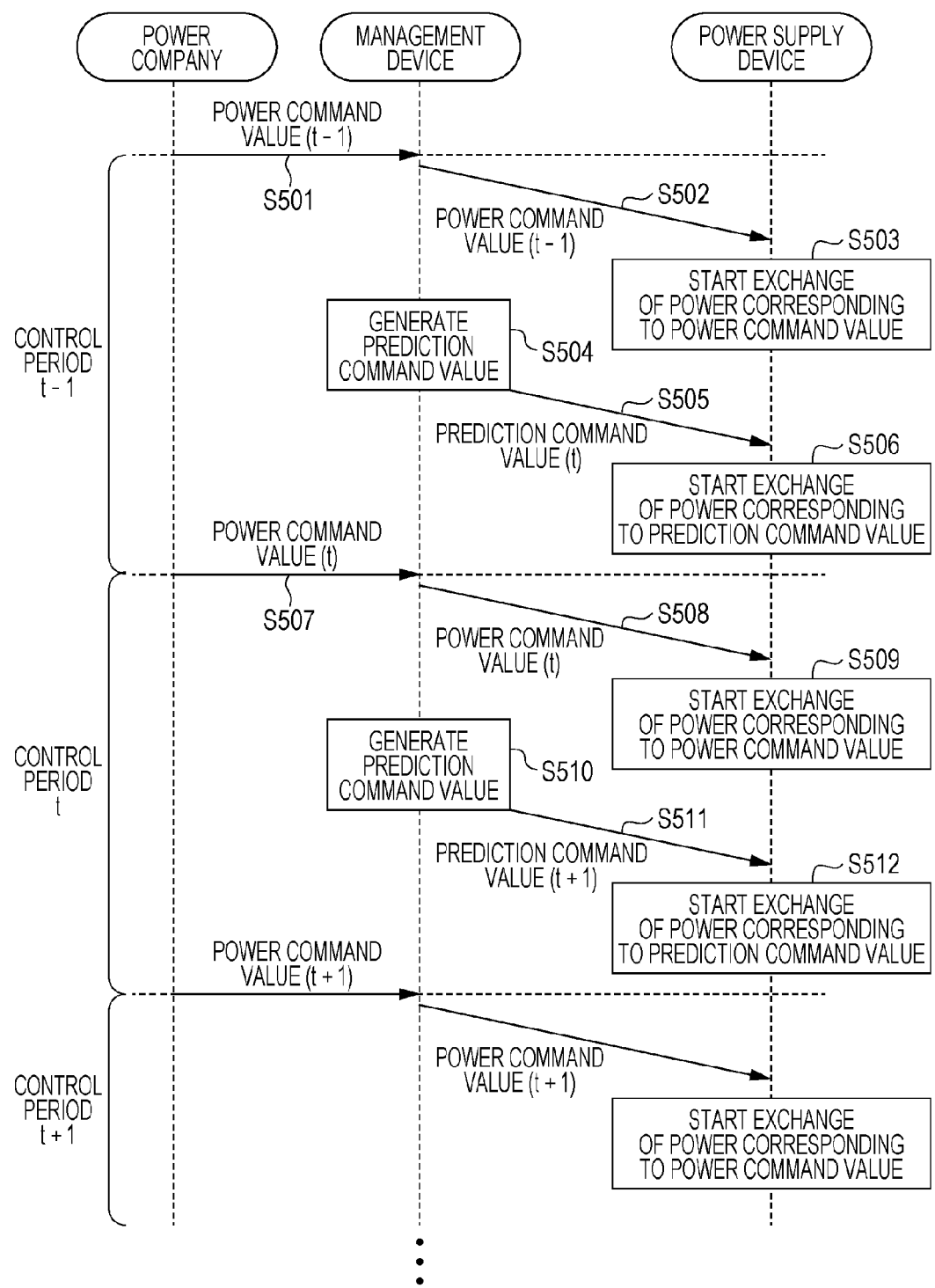
FIG. 5 is a sequence diagram illustrating operation of a power system stabilization system.
Figure 6:
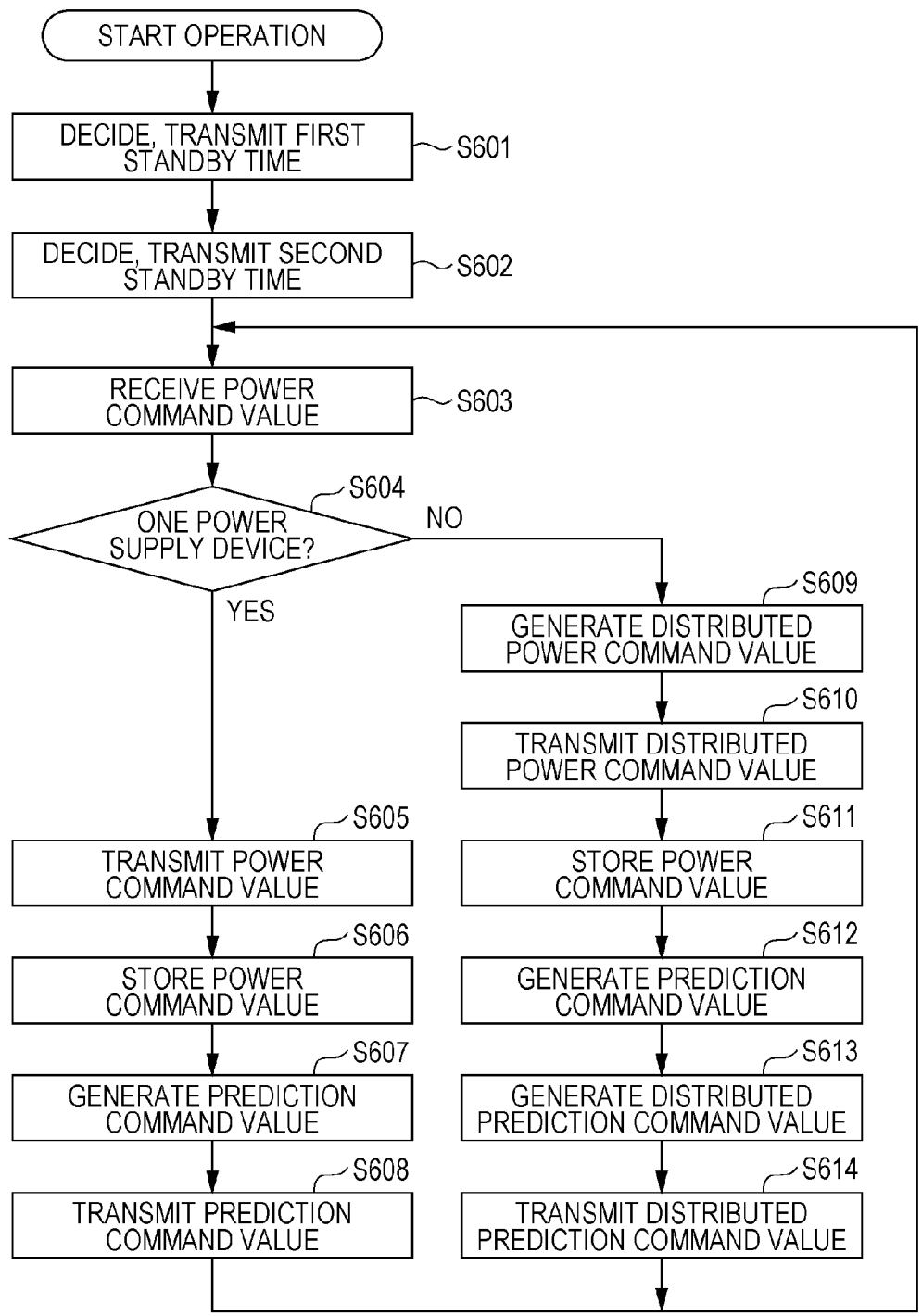
FIG. 6 is a flowchart illustrating operation of a management device.
Figure 7:
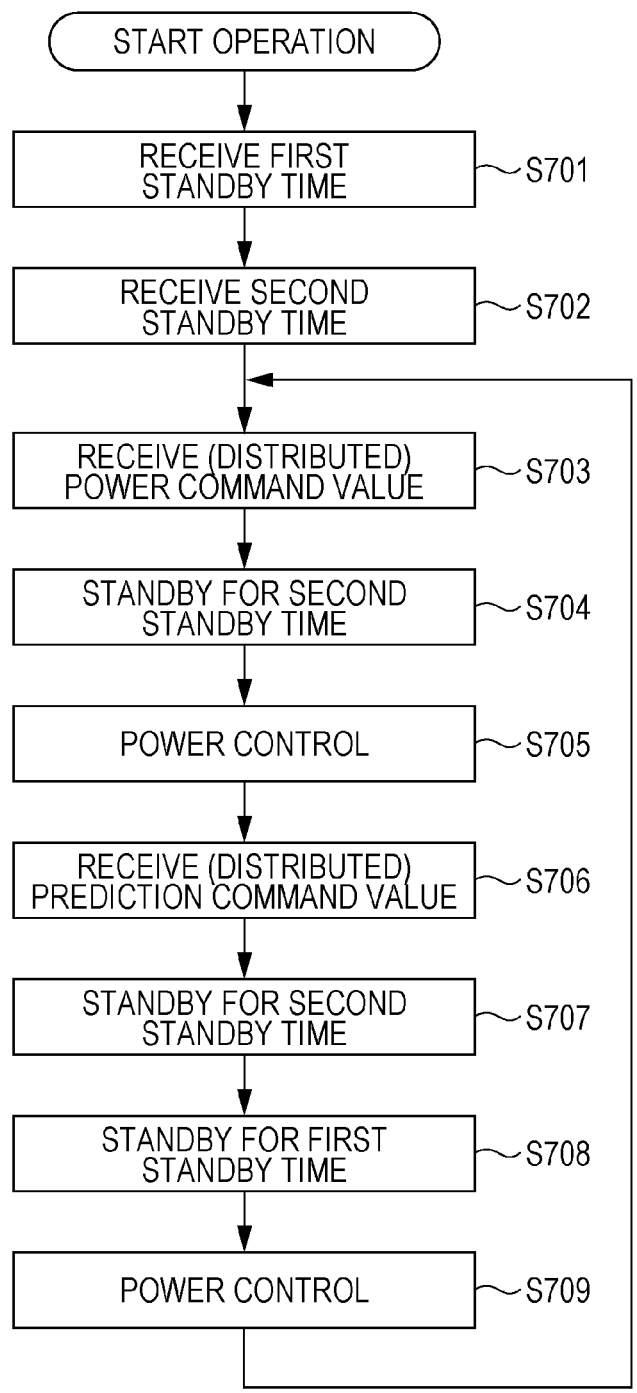
FIG. 7 is a flowchart illustrating operation of a power supply device.

First, the sequence diagram illustrated in FIG. 5 will be used to describe operation of the power system stabilization system, and after that, FIGS. 6 and 7 will be used to describe the operation of each of the management device and the power supply device.

FIG. 5 is a sequence diagram illustrating an overview of power control by the power system stabilization system. The horizontal direction of FIG. 5 illustrates exchange between devices, while the vertical direction illustrates the passage of time.

Note that, although not illustrated in FIG. 5, it is supposed that the management device 100 has decided the first standby time in advance, and has transmitted the first standby time to the power supply device 110.

As illustrated in FIG. 5, the power company 120 transmits a power command value (t−1) for a control period t−1 (step S501), and the management device 100 transmits the received power command value (t−1) as-is to the power supply device 110 (step S502). Note that, as discussed earlier, since the present embodiment describes the case of a single power supply device 110, the present embodiment is configured to transmit the power command value as-is. However, when there are multiple power supply devices 110 under the management of the management device 100, the power command value may not be transmitted as-is, and a distributed power command value may be transmitted to each of the multiple power supply devices to enable the execution of power control that satisfies the relevant power command value across the overall system. As discussed earlier, since a communication delay exists on the communication network 130 between the management device 100 and the power supply device 110, as illustrated in FIG. 5, the power command value arrives at the power supply device 110 somewhat delayed after the timing at which the power command value was transmitted from the power company 120.

After receiving the power command value (t−1), the power supply device 110 executes power control according to the power command value (t−1) (step S503). Note that in the case of handling multiple power supply devices, a pre-planned transmission delay is provided as a second standby time to thereby standardize the transmission delay times of the respective power supply devices, and enable simultaneous synchronized control. However, since a single power supply device is being considered herein, suppose that the second standby time is 0.

Meanwhile, after receiving the power command value (t−1), the management device 100 transmits the power command value (t−1) to the power supply device 110, and additionally generates a prediction command value (t), which is a prediction of the power command value (t) for the next control period t (step S504). Note that in the case of successively generating the first standby time, the management device 100 generates the first standby time in step S504. Subsequently, the management device 100 transmits the generated prediction command value (t) and the first standby time (t) (not illustrated) to the power supply device 110 (step S505).

The power supply device 110 that receives the prediction command value (t) executes power control based on the prediction command value (t) after reaching the time obtained by adding the decided first standby time to the time when the prediction command value was received (step S506).

When the next control period t is reached, the power company 120 transmits a power command value (t) for the control period t (step S507), and the management device 100 transmits the received power command value (t) as-is to the power supply device 110 (step S508).

Similarly to step S503, after receiving the power command value (t), the power supply device 110 executes power control according to the power command value (t) (step S509).

Meanwhile, similarly to step S504, after receiving the power command value (t), the management device 100 transmits the power command value (t) to the power supply device 110, and additionally generates a prediction command value (t+1), which is a prediction of the power command value (t+1) for the next control period t+1 (step S510). The management device 100 also generates the first standby time. Subsequently, similarly to step S505, the management device 100 transmits the generated prediction command value (t+1) and the first standby time (t+1) (not illustrated) to the power supply device 110 (step S511).

Similarly to step S506, the power supply device 110 that receives the prediction command value (t+1) decides the timing at which to execute power control based on the prediction command value, and after reaching the time obtained by adding the decided standby time to the time when the prediction command value was received, the power supply device 110 executes power control based on the relevant prediction command value (t+1) (step S512).

Thereafter, the power system stabilization system 1000 repeatedly executes the combined set of processes illustrated in steps S501 to S506 (S507 to S512).

n the power system stabilization system as illustrated in FIG. 5, basically, power control based on the prediction command value is conducted in alternation with power control based on the power command value. By conducting power control based on the power command value and power control based on the prediction command value in units of control periods, power control that is close to the originally desired power control (power control in the case of a small communication delay on the communication network 130) is realized.

Note that in step S507 and step S508, if the difference between the prediction command value (t) and the power command value (t) is less than a predetermined value, the management device 100 may be configured to not transmit the power command value (t). In this case, in step S511, the power supply device 110 continues power control based on the prediction command value (t) until the prediction command value (t+1) is received. As a result, it becomes possible to halve the number of messages that the power supply device 110 transmits in the control period t.

FIG. 6 is a flowchart illustrating operation of a management device 100 according to an embodiment. FIG. 6 illustrates an example of the management device 100 deciding a standby time in advance.

The processing unit 104 of the management device 100 decides the first standby time in advance (for example, a time decided once each day), and the transmitting unit 102 transmits the decided first standby time (step S601). If there are multiple power supply devices 110 to be controlled, the second standby time is decided, and the transmitting unit 102 transmits the decided second standby time (step S602). Note that the second standby time is decided to be 0 when there is one power supply device 110, but it may also be configured so that the execution of step S602 is omitted.

The receiving unit 101 of the management device 100 receives the power command value from the power company 120 (step S603).

The processing unit 104 of the management device 100 determines whether or not there is one power supply device 110 to be controlled (step S604).

If there is one power supply device 110 (step S604, YES), after receiving the power command value, the receiving unit 101 transmits the power command value as-is to the transmitting unit 102.

The transmitting unit 102 receives the power command value from the receiving unit 101, attaches an identifier indicating that the information to be transmitted is the power command value, encodes the information, and transmits an encoded signal including the power command value to the power supply device 110 via the communication network 130 (step S605).

In addition to receiving the power command value and transmitting the power command value to the transmitting unit 102, the receiving unit 101 records the received power command value in the storage unit 103 (step S606), and notifies the processing unit 104 that the power command value was received.

The processing unit 104, after being notified by the receiving unit 101 that the power command value was received, reads out a predetermined number (herein, 10) of the most recent power command values from the storage unit 103, including the currently received power command value. The processing unit 104 uses the retrieved power command values to generate a prediction command value, which is a value predicting the next power command value, according to an autoregressive model, for example (step S607).

Specifically, in the case of using an autoregressive model, a prediction command value p+1, which is a value predicting the next power command value, is generated according to the following formula (1).

[Math. 1]

$$p_{t+1} = a_0 c_t + a_1 c_{t-1} + \ldots + a_{N-1} c_{t-(N-1)} + e \qquad (1)$$

In the above formula (1), c represents the power command value, while a represents a parameter of the model, and e represents error. For the sake of simplicity, constant terms are omitted. Also, t represents the control period, where t is the current control period, and t+1 is the next control period. Also, N represents the number of power command values read out from the storage unit 103.

After generating the prediction command value, the processing unit 104 transmits the generated prediction command value to the transmitting unit 102.

The transmitting unit 102 receives the prediction command value from the processing unit 104, attaches an identifier indicating that the information to be transmitted is the prediction command value, encodes the information, transmits an encoded signal including the prediction command value to the power supply device 110 via the communication network 130 (step S608), and returns to step S603.

When there are multiple power supply devices 110 (step S604, NO), the processing unit 104 of the management device 100 generates the distributed power command value for each power supply device 110 from the power command value received by the receiving unit 101 (step S609). The processing unit 104 transmits the generated distributed power command value to the transmitting unit 102.

The transmitting unit 102 receives the distributed power command value from the processing unit 104, attaches an identifier indicating that the information to be transmitted is the (distributed) power command value, encodes the information, and transmits an encoded signal including the distributed power command value to each power supply device 110 via the communication network 130 (step S610).

After receiving the power command value, the receiving unit 101 records the received power command value in the storage unit 103 (step S611), and notifies the processing unit 104 that the power command value was received.

The processing unit 104, after being notified by the receiving unit 101 that the power command value was received, generates the prediction command value similarly to step S607 (step S612).

Subsequently, since there are multiple power supply devices 110 in this case, the processing unit 104 generates the distributed prediction command value for each power supply device 110 from the generated prediction command value according to the status of each power supply device 110 (such as the remaining battery level and discharge capacity), and after generating the distributed prediction command value, the processing unit 104 transmits the generated distributed prediction command value to the transmitting unit 102 (step S613).

The transmitting unit 102 receives the distributed prediction command value from the processing unit 104, attaches an identifier indicating that the information to be transmitted is the (distributed) prediction command value, encodes the information, transmits an encoded signal including the distributed prediction command value to each power supply device 110 via the communication network 130 (step S614), and returns to step S603.

Note that in steps S608 and S612, the processing unit 104 may also save the generated prediction command value in the storage unit 103.

The foregoing thus describes operation of the management device 100.

Next, operation of the power supply device 110 will be described. FIG. 7 is a flowchart illustrating operation of a power supply device 110 according to an embodiment.

As illustrated in FIG. 7, the receiving unit 111 of the power supply device 110 receives the first standby time from the management device 100. The receiving unit 111 stores the received first standby time in the storage unit 112 (step S701).

When there are multiple power supply devices 110, the receiving unit 111 receives the second standby time from the management device 100. The receiving unit 111 stores the received second standby time in the storage unit 112 (step S702).

The receiving unit 111 of the power supply device 110 receives a signal including the power command value from the management device 100. The receiving unit 111 receives and decodes the signal, and transmits the obtained power command value to the control unit 113 (step S703). Note that the receiving unit 111 may also store the received power command value in the storage unit 112.

After receiving the power command value, the control unit 113 reads out the second standby time being stored in the storage unit 112, and after the second standby time elapses, transmits the received power command value to the power control unit 114 (step S704). Note that when there is one power supply device, the second standby time is 0. In other words, the control unit 113 does not stand by.

After receiving the power command value, the power control unit 114 executes power control (discharging or charging) based on the received power value (step S705).

Next, the receiving unit 111 receives a signal including the prediction command value from the management device 100. The receiving unit 111 decodes and transmits the received signal to the control unit 113 (step S706). Note that the receiving unit 111 may also store the received prediction command value in the storage unit 112.

The control unit 113 reads out the second standby time saved in the storage unit 112, and stands by until the second standby time elapses (step S707). Note that when there is one power supply device, the second standby time is 0.

Next, the control unit 113 reads out the first standby time saved in the storage unit 112, and stands by until the first standby time elapses (step S708).

Subsequently, after the first standby time elapses, the control unit 113 transmits the received prediction command value to the power control unit 114, the power control unit 114 conducts power control according to the transmitted prediction command value (step S709), and the process returns to step S703.

By conducting power control based on the prediction command value and the power command value as above, it is possible to more suitably keep the power frequency of the power system 150 within a desired range.

Herein, FIG. 8 is a chart illustrating relationships between the number of power supply devices 110 and the standby times. According to FIG. 8, when there is one power supply device 110, after the power supply device 110 receives the prediction command value, the power supply device 110 stands by for the first standby time, and conducts power control according to the prediction command value. In addition, after receiving the power command value, the power supply device 110 conducts power control according to the power command value, with no standby time (the second standby time is taken to be 0).

Additionally, according to FIG. 8, when there are two or more power supply devices 110, after the power supply device 110 receives the distributed prediction command value, the power supply device 110 stands by for the second standby time, additionally stands by for the first standby time, and conducts power control according to the distributed prediction command value. Note that the power supply device 110 may also be configured to stand by for the first standby time, and then stand by for the second standby time. In addition, after receiving the distributed power command value, the power supply device 110 stands by for the second standby time, and conducts power control according to the distributed power command value.

<Considerations>

Hereinafter, the differences and advantageous effects of power control according to the power system stabilization system compared to power control of the related art will be discussed.

Figure 9:
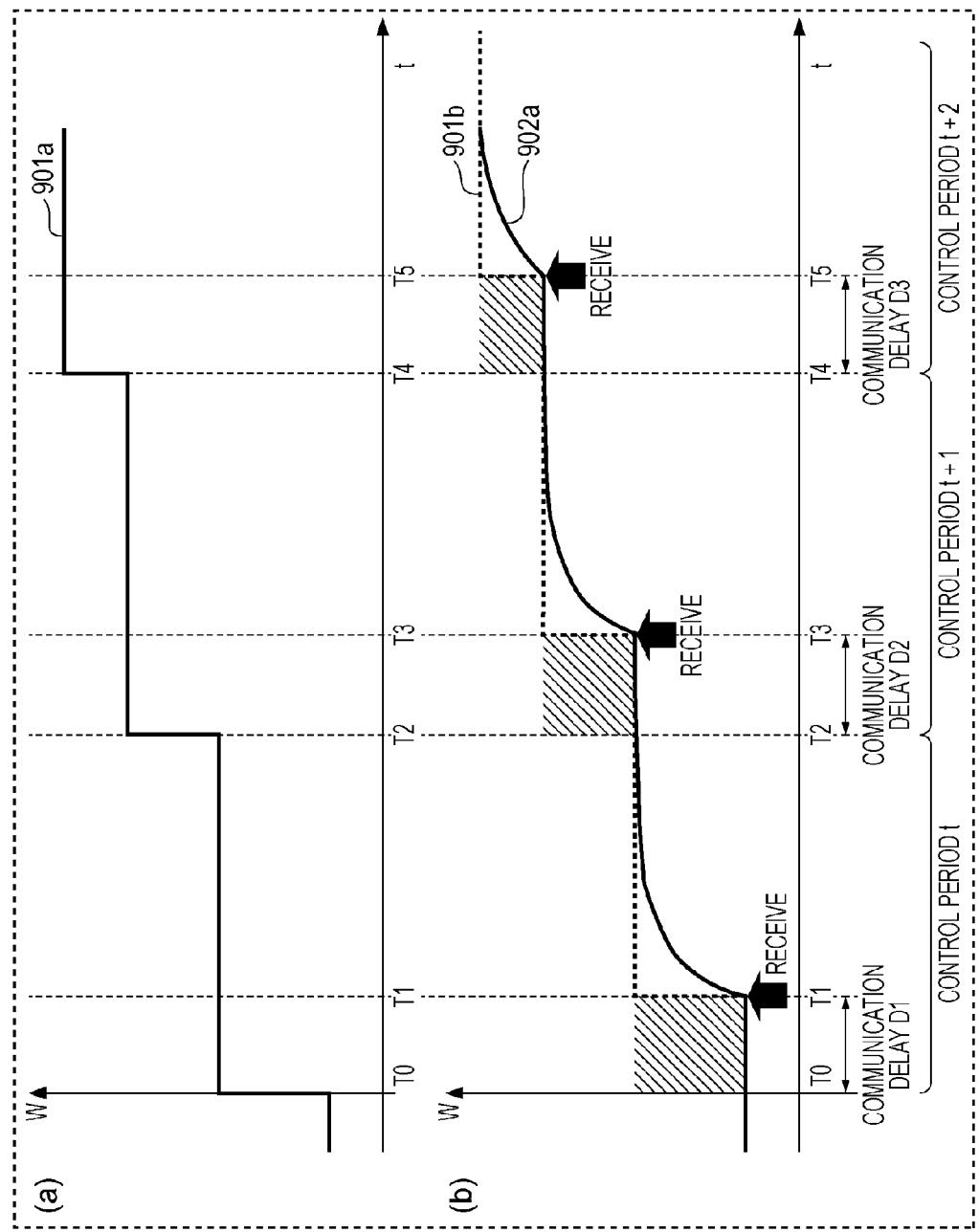
FIG. 9 is a graph illustrating transitions in a power command value when conducting control according to the related art, and transitions in power control executed by a power supply device.

FIG. 9 is a diagram illustrating power control in the case of following a technique of the related art. In this case, as an exemplary system configuration of the related art, suppose that a management device transmits a power command value to a power supply device, and the power supply device executes power control based on the power command value. FIG. 9(*a*) is a graph illustrating transitions in the power command value transmitted from the management device (or a power company) to the power supply device, while FIG. 9(*b*) is a graph illustrating transitions in the power according to the power control actually conducted by the power supply device. FIGS. 9(*a*) and 9(*b*) are both graphs that take time as the horizontal axis and the power value as the vertical axis.

The solid line 901*a* in FIG. 9(*a*) indicates transitions in the power command value transmitted by the management device. Also, the solid line 902*a* in FIG. 9(*b*) indicates transitions in charging/discharging based on power control executed by the power supply device. Additionally, the dashed line 901*b* in FIG. 9(*b*) indicates transitions in the power command value received by the power supply device.

As illustrated in FIG. 9(*a*), the power command value is transmitted from the management device to the power supply device periodically (times T0, T2, and T4 in FIG. 9).

As illustrated in FIG. 9(*b*), the power command value transmitted from the management device (see the solid line 901*a* in FIG. 9(*a*)) is received by the power supply device after a communication delay on the communication network (see the dashed line 901*b* in FIG. 9(*b*)). In other words, the power command value transmitted at time T0 is received by the power supply device at time T1 after a communication delay D1. The power command value transmitted at time T2 is received by the power supply device at time T3 after a communication delay D2, and the power command value transmitted at time T4 is received by the power supply device at time T5 after a communication delay D3. Consequently, the power supply device is only able to execute power control according to the power command values starting from the timings when the power command values are received (times T1, T3, and T5 in FIG. 9). For this reason, power tracking control is clearly unavailable in the shaded portions indicated in FIG. 9(b), and there is a risk of causing an inexpedience such as the power frequency deviating from a predetermined range, or power loss.

Figure 10:
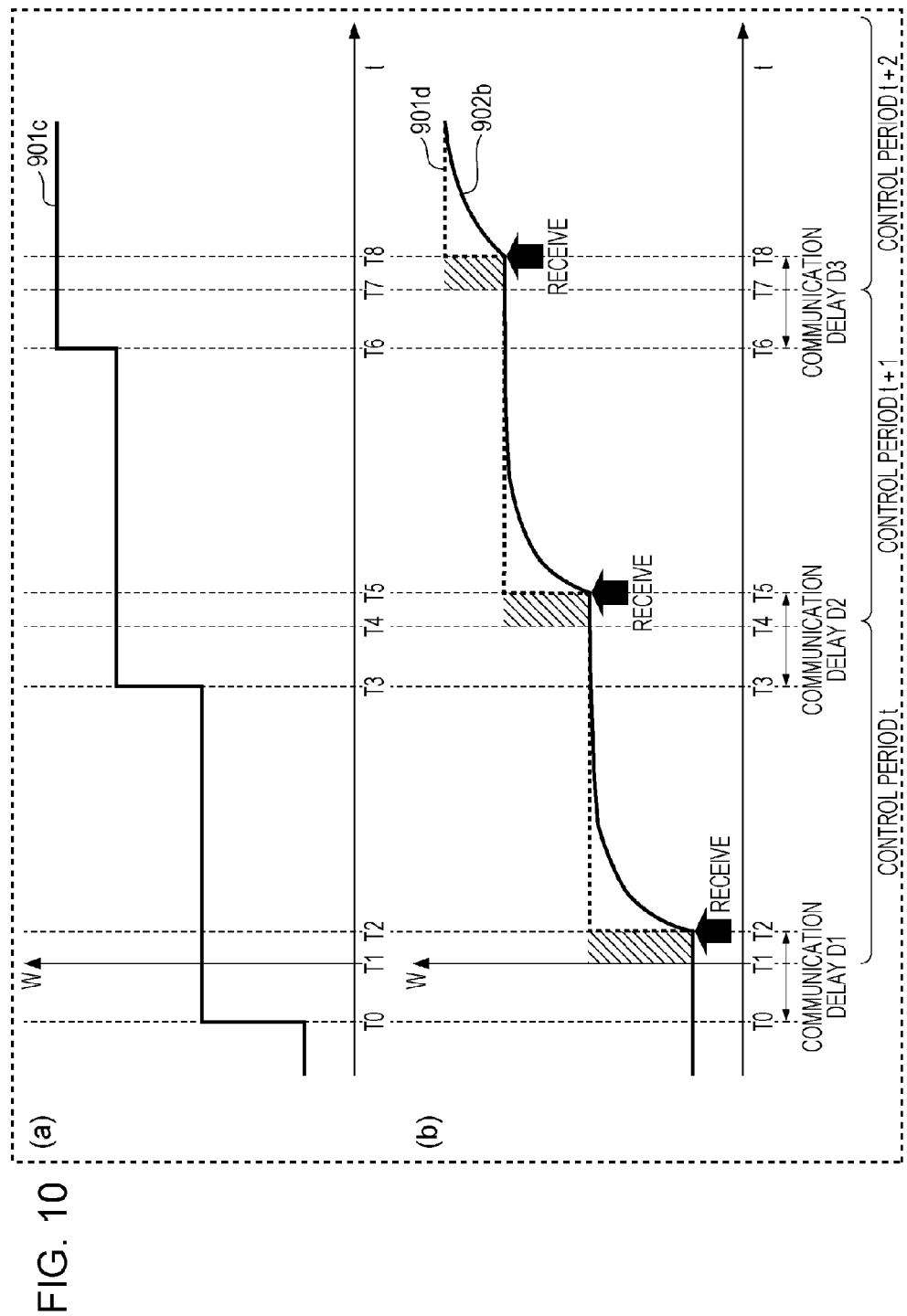
FIG. 10 is a graph illustrating transitions in a power command value when front-loading the power command value, and transitions in power control executed by a power supply device.

In contrast, FIG. 10 will be used to describe a comparison with the technique described in PTL 1. Suppose that the system configuration is similar to the case described using FIG. 9. Likewise in FIGS. 10(a) and 10(b), the horizontal axis indicates time, and the vertical axis indicates the power value. The solid line 901c in FIG. 10(a) indicates transitions in the power command value transmitted by the management device, while the solid line 902b indicates transitions in the charging/discharging according to power control executed by the power supply device. Additionally, the dashed line 901d in FIG. 10(b) indicates transitions in the power command value received by the power supply device. Note that although the transitions in the power command value (the solid line 901c) change at different timings, for the sake of comparison, suppose that control is conducted at the same values as in FIG. 9(a).

If the technique described in PTL 1 is followed, as illustrated in FIG. 10(a), front-loaded transmission of the power command value is possible compared to the case of FIG. 9(a). In other words, the management device transmits the power command value that was transmitted at time T0 in FIG. 9(a) (time T1 in FIG. 10(a)) at the earlier time T0 in FIG. 10(a). Similarly, the management device transmits the power command value that was transmitted at time T2 in FIG. 9(a) (time T4 in FIG. 10(a)) at the earlier time T3 in FIG. 10(a). Also, the management device transmits the power command value that was transmitted at time T4 in FIG. 9(a) (time T7 in FIG. 10(a)) at the earlier time T6 in FIG. 10(a).

As a result, even though the transmitted power command value is delivered to the power supply device after a communication delay (D1, D2, and D3 in FIG. 10(b)), as illustrated in FIG. 10(b), obviously power control may be started at earlier timings (the times T2, T5, and T8 in FIG. 10(b)) compared to FIG. 9(b). Consequently, as indicated by the shaded portions in FIG. 10(b), the loss due to the delay in the power control may be reduced (the shaded portions may be reduced) compared to that illustrated in FIG. 9(b).

However, the technique described in PTL 1 is only capable of such front-loaded transmission because the management device itself is generating the power command value (such as in the case of a power company maintaining the management device). On the other hand, the technique described in PTL 1 is unusable in the case in which a management device conducts power control by receiving the power command value from a power company, as illustrated in FIG. 1. In addition, in the case of front-loaded transmission of the power command value, there is a possibility of being unable to execute correct power control in a control period if the power frequency of the power system changes suddenly. Also, with the technique described in PTL 1, since the power supply device adjusts its output immediately after receiving the power command value transmitted by front-loading, if the timings of the front-loaded transmission (T0, T3, and T6 in FIG. 10) are not suitable (for example, if T1−T0>D1), there is a possibility of creating the opposite effect of decreasing tracking performance with respect to the power command value.

Figure 11:
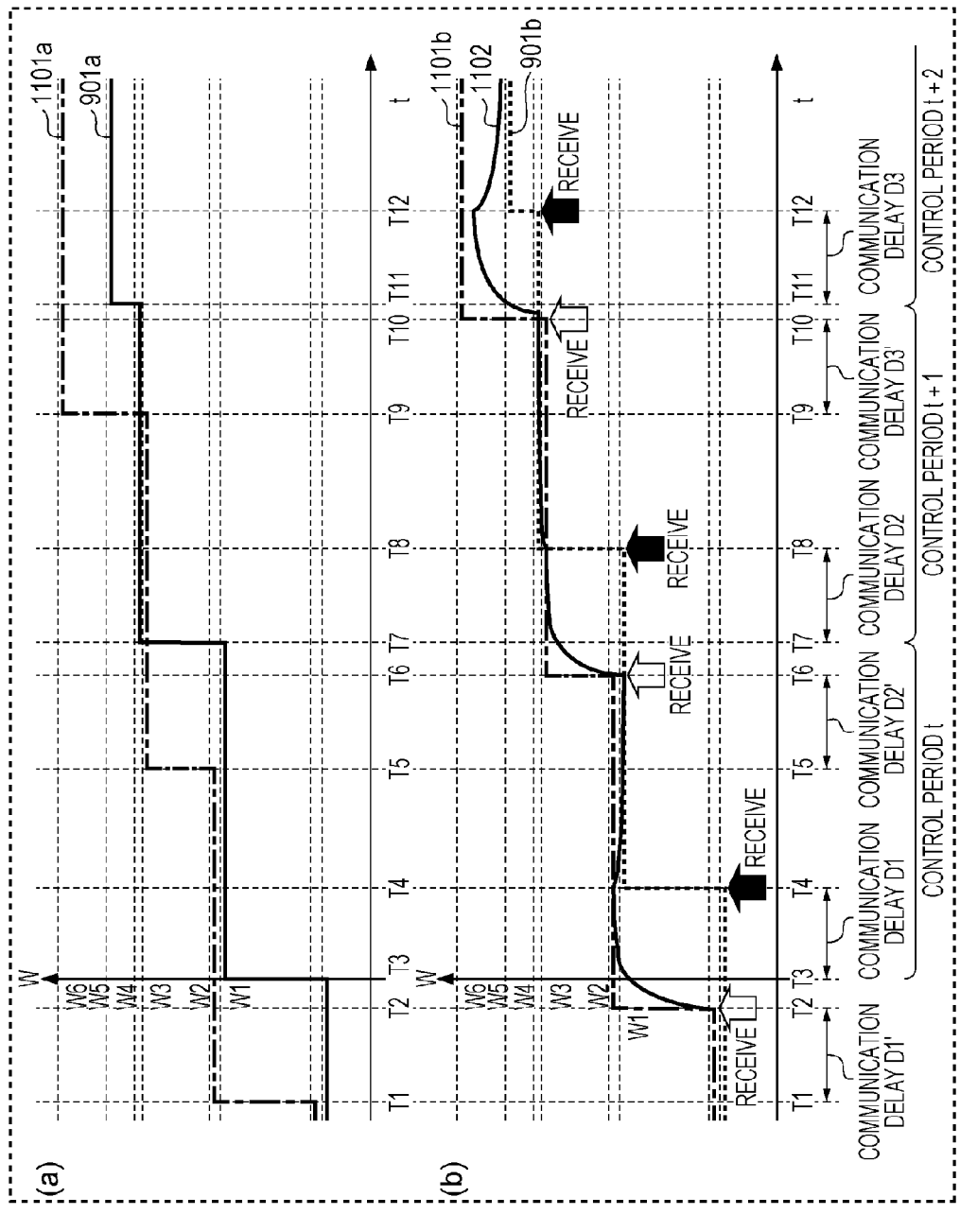
FIG. 11 is a graph illustrating transitions in a prediction command value and a power command value by a power system stabilization system according to the present disclosure, and transitions in power control based thereon.

FIG. 11 is a diagram illustrating an example of power control by the power system stabilization system 1000 according to the present embodiment. FIG. 11(a) is a graph illustrating transitions in the power command value and the prediction command value transmitted by the management device 100. Meanwhile, FIG. 11(b) is a graph illustrating transitions in the charging/discharging according to power control executed by the power supply device 110. In FIG. 10(b), the black arrows indicate the timings at which the power supply device 110 receives the power command value, while the white arrows indicate the timings at which the power supply device 110 receives the prediction command value. Likewise in FIGS. 11(a) and 11(b), the horizontal axis indicates time, and the vertical axis indicates the power value.

The solid line 901a in FIG. 11(a) indicates transitions in the power command value transmitted to the power supply device by the management device 100, while the chain line 1101a indicates transitions in the prediction command value transmitted to the power supply device by the management device 100. Since the transitions in the power command value in FIG. 11(a) are similar to those illustrated in FIG. 9(a), the same sign (901a) is given. In addition, the solid line 1102 in FIG. 11(b) indicates transitions in the charging/discharging according to power control executed by the power supply device 110, while the chain line 1101b in FIG. 11(b) indicates transitions in the prediction command value received by the power supply device 110, and the dashed line 901b indicates transitions in the power command value received by the power supply device 110. In the case of FIG. 11, since the transitions in the power command value received by the power supply device 110 are similar to the case of FIG. 9, the same sign (901b) is given.

As illustrated in FIG. 11(a), the power command value is transmitted at times T3 (T0 in FIG. 9(a)), T7 (T2 in FIG. 9(a)), and T11 (T4 in FIG. 9(a)). On the other hand, unlike the related art, the management device 100 additionally transmits the prediction command value at times T1, T5, and T9 in FIG. 11. The prediction command value transmitted at time T1 is a prediction of the power command value at time T3, while the prediction command value transmitted at time T5 is a prediction of the power command value at time T7, and the prediction command value transmitted at time T9 is a prediction of the power command value at time t11.

As illustrated in FIG. 11, the prediction command value (t) transmitted at time T0 is received by the power supply device 110 at time T2 after a communication delay D1'. The power supply device 110 executes power control according to the received prediction command value (t).

The power command value (t) transmitted at time T3 is received by the power supply device 110 at time T4 after a communication delay D1. The power supply device 110 switches from power control based on the prediction command value (t) to power control based on the power command value (t). In other words, the charge/discharge value is made to approach W1. For this reason, the power control is made to track the power command value (t) starting from time T4, as indicated by the solid line in FIG. 11(b).

The prediction command value (t+1) transmitted at time T5 is received by the power supply device 110 at time T6 after a communication delay D2'. After receiving the prediction command value (t+1), the power supply device 110 switches from power control based on the power command value (t) to power control based on the prediction command value (t+1). In other words, the charge/discharge value is made to approach W3.

The power command value (t+1) transmitted at time T7 is received by the power supply device 110 at time T8 after a communication delay D2. The power supply device 110 switches from power control based on the prediction command value (t) to power control based on the power command value (t). In other words, the charge/discharge value is made to approach W4. For this reason, the power control is made to track the power command value (t) starting from time T8, as indicated by the solid line in FIG. 11(b).

The prediction command value (t+2) transmitted at time T9 is received by the power supply device 110 at time T10 after a communication delay D3'. At this point, the power supply device 110 determines that the confidence of the prediction command value is low, and thus lengthens the standby time, and after waiting for the standby time, starts power control based on the prediction command value (t+2).

The power command value (t+2) transmitted at time T11 is received by the power supply device 110 at time T12 after a communication delay D3. At this point, the power supply device 110 switches from power control based on the prediction command value (t+2) to power control based on the power command value (t+2).

n the case of determining that the confidence of the prediction by the prediction command value is low, the start of power control based on the prediction command value is delayed. Consequently, by switching to power control based on the power command value (t+2) before the power output from the power supply device 110 fully rises to W6 of the prediction command value (t+2), it is possible to avoid large overshooting of the power command value in power control based on the prediction command value. Note that in the example of FIG. 11, overshooting occurs because the power command value (t+2) is greater than the power command value (t+1) (W5>W4), but undershooting obviously occurs when the power command value (t+2) is less than the power command value (t+1).

The above thus demonstrates that the power control by the power supply device 110 indicated by the solid line in FIG. 11(b) stays very close to the originally desired transitions in the power command value indicated in FIG. 9(a), thereby demonstrating that effective power control may be executed. Consequently, the power frequency of the power system 150 may be controlled to remain within a suitable, predetermined range.

Next, advantageous effects of power control using a standby time in a power system stabilization system will be described hereinafter.

First, the advantageous effects of the first standby time will be described.

As discussed earlier, frequency control is conducted by controlling the rotational frequency of the generator, or adjusting the output of the generator according to a power command value from a power company (power control center). For the latter case, prediction of the command value is conceivable as a basic technique for improving the responsiveness of the control system with respect to successively issued power command values.

However, there is a high likelihood that prediction will be essentially difficult, due to factors such as the issue that the process for computing the power command value is not necessarily clear, and in addition, the issue that the prediction command values normally include sudden variations, even though the prediction command values are supplied at a comparatively long sample time interval compared to the control period of the control system. For this reason, if the accuracy of the prediction command value is low, there is a risk that prediction may have the opposite effect and lower the responsiveness of the control system.

According to the present disclosure, by providing a set first standby time when applying the prediction command value, the response of the power supply device 110 is uniformly delayed by the first standby time, but in exchange, it is possible to reduce the maximum value of overshooting or undershooting produced when the prediction of a difficult-to-predict power command value is significantly incorrect. Consequently, it is possible to improve the responsiveness of the control system.

Next, the advantageous effects of the second standby time will be described.

Since power supply devices are ordinarily installed in a distributed manner in multiple locations, different communication delays may occur in the above control, and thus it is desirable that the above control be executed in synchronization over the group of power supply devices. Furthermore, in the case of controlling multiple power supply devices, a given power command value is distributed and transmitted to each power supply device, and at this point, different communication delays may occur in each transmission. At this point, unless some kind of innovation is employed to conduct synchronized control, a problem may occur in which the total output from the power supply devices does not match the waveform of the original power command value.

According to the present disclosure, in the case of handling multiple power supply devices, a value that is larger than the maximum value of the anticipated delay time in transmission between the management device and the power supply device may be designated as a second standby time to enable each power supply device to start control at the same time. Consequently, by sacrificing immediate responsiveness similarly to the above, it is possible to standardize the transmission delay time between the management device and each power supply device. In addition, the simultaneous coordinated control of multiple power supply devices becomes possible, so that although the total control power output from the power supply devices includes the introduced standby time delay with respect to a given power command value, degraded correlation of the waveforms may be prevented.

Note that this standby time may be applied independently of the prediction algorithm. For example, even in the case of a power supply device being operated by using a pre-existing prediction algorithm and having a controller whose performance is not re-adjustable, it is still possible to adjust the response performance of the system overall by varying the delay time.

<Modifications>

The foregoing embodiment thus describes a power control system according to the present disclosure, but the present disclosure is not limited thereto. Hereinafter, various exemplary modifications included in the concept of the present disclosure will be described.

(1) In the foregoing embodiment, the management device 100 is configured to receive the power command value from the power company 120, and output to each power supply device 110. However, the above is not limiting, and the management device 100 itself may also be configured to generate the power command value.

In this case, the management device 100 is equipped with a detection function that detects the power frequency of the power system 150. The management device 100 then issues a charge instruction to the power supply device 110 when the detected power frequency fm is higher than the power frequency at which the power system 150 should operate (for example, when fm>50+0.1 Hz (an example of setting the operating power frequency to 50 Hz)). Also, when the detected power frequency fm is lower than the power frequency at which the power system 150 should operate (for example, when fm<50−0.1 Hz), the management device 100 issues a discharge instruction to discharge power depending on the difference between the detected frequency and the proper operating frequency. Even in the case in which the management device 100 generates the power command value and transmits the power command value to the power supply device at the start time of each control period, the transmission delay correction by the second standby time is still effective, and the tracking performance of power control based on the power command value according to relevant prediction may be increased.

(2) In the foregoing embodiment, the power company 120 is given as an example of the entity that transmits the power command value, but the entity that transmits the power command value is not limited to the power company 120. A configuration other than the power company 120 is acceptable insofar as the configuration is able to transmit the power command value, and may be a server device or the like operated by what is called an energy service provider, for example. Also, if power generation and distribution are separated, the power company 120 may also be a system operator.

(3) In the foregoing embodiment, the power supply device 110 acquires the prediction command value and directly conducts power control based on the prediction command value, but the power supply device 110 may also be configured as follows. Namely, rather than using the acquired prediction command value as-is, the power supply device 110 may also be configured to correct the prediction command value and conduct power control based on the corrected prediction command value. In this case, the first standby time may be set to 0, and the correction of the prediction command value and the adjustment of the first standby time may be carried out collectively.

Specifically, the power supply device 110 acquires the prediction command value, and compares the prediction command value to the power value of the power control being conducted at that time. Subsequently, the power supply device 110 corrects the prediction command value so that the power value of the power control changes smoothly.

Note that the method of correcting the prediction command value is not limited to the above, and may be any method that enables the power control of the power supply device 110 to track the power command value as closely as possible. For example, a manager of the power supply device 110 or management device 100 may define a suitable correction method as appropriate, and a circuit that executes the correction method may be physically installed in the power supply device 110, or a program that executes the correction method may be installed in the power supply device 110. Also, cases that impose output restrictions on the power supply device 110 for special reasons such as equipment malfunction may also be used.

(4) In the foregoing embodiment, an autoregressive model is used as the technique for computing a function indicating transitions in the power command value, but this is merely an example, and a technique other than an autoregressive model may also be used insofar as a function indicating transitions in the power command value may be computed. For example, techniques such as the method of least squares, an autoregressive moving average model, or a neural network may also be used.

(5) In the foregoing embodiment, the prediction command value is generated by using a predetermined number of the most recent power command values, but power command values other than the above (a predetermined number of the most recent power command values) may also be used to generate the prediction command value. For example, an average value of power command values issued at the same time on a different day from the control period in which to apply the prediction command value may be treated as the prediction command value.

(6) Although the foregoing embodiment illustrates an example of using a standby time chart as a technique for deciding the first standby time, a technique other than using a standby time chart may also be used insofar as the first standby time may be decided.

For example, the management device 100 may store in advance a function enabling the computation of the first standby time indicated on the standby time chart, the input of the function being information quantifying environmental parameters such as the weather or atmospheric temperature, and the output of the function being the first standby time. This function thus may be used to compute the first standby time.

As an alternative example, a default first standby time (for example, 100 milliseconds) may be defined in advance, and the default first standby time may be shortened or lengthened according to the confidence of the prediction command value (the probability that the prediction command value is close to the actual power command value). If the confidence of the prediction command value is high, the first standby time may be shortened, and if low, the first standby time may be lengthened. The first standby time may be shortened or lengthened by a predetermined degree depending on the confidence. In addition, as indicated in the foregoing embodiment, information quantifying environmental parameters such as the weather or atmospheric temperature may be used as the confidence of the prediction command value, for example.

(7) The management device 100 may transmit the power command value and the prediction command value to multiple power supply devices 110 so that the same power control is conducted, or transmit an individual power command value (distributed power command value) and prediction command value (distributed prediction command value) to each power supply device 110. The former enables simpler processing by uniformly controlling multiple power supply devices 110, and as a result, the load on the management device 100 may be reduced. Meanwhile, in the latter cause, since the management device 100 generates and transmits an individual power command value and prediction command value to each power supply device 110, the processing load on the management device 100 increases, but it becomes possible to carry out finer power control compared to the case of uniform control. Consequently, it becomes possible to carry out power control according to the performance of each power supply device 110 (such as the remaining level, degree of wear, and inverter loss, for example).

(8) In the foregoing embodiment, the power company 120 transmits the power command value periodically (in the foregoing embodiment, every 2 s). However, if the management device 100 and the power supply device 110 are able to recognize the start time and the end time of each control period, the transmission of the power command value may also not be periodic, and fluctuations in the transmission interval of the power command value may be produced. For example, by having the management device 100 transmit the power command value aligned with the end time, the power supply device 110 is able to recognize the end time.

In addition, the power company 120 may also send the power command value only once. In this case, an end time or a duration may also be transmitted together with the power command value.

(9) In the foregoing embodiment, generating the prediction command value and deciding the standby time is executed by the management device 100. However, these processes may also be executed by a device other than the management device 100, insofar as the device is able to acquire the power command value, and transmit the prediction command value and standby time information to the power supply device 110 at suitable timings. For example, the power supply device 110 or a cloud server connected to the power supply device 110 may be configured to execute the above processes.

(10) The foregoing embodiment describes a storage battery system (power supply device 110) as an example of equipment that exchanges power with the power system 150, but the power supply device 110 may also be equipment other than a storage battery system. For example, although for discharging power only, an electricity generator such as a solar panel may be used instead of a storage battery system. By equipping such an electricity generator with the control unit 113 illustrated in the foregoing embodiment, a raise control to raise the power frequency of the power system 150 may be executed when electricity is generated. Also, if such an electricity generator is equipped with a storage battery and configured to enable charging, control similar to the foregoing Embodiment 1 becomes possible, and the power supply device 110 may be configured to have a charging path from other than the power system 150.

(11) Although the foregoing embodiment only illustrates an example of the power command value increasing (see FIG. 11), the power command value obviously may also decrease and even become negative according to the power frequency of the power system 150.

(12) Although the foregoing embodiment is configured to transmit the power command value every time, in the case in which the management device 100 receives multiple power command values in advance from the power company 120, the management device 100 may transmit multiple power command values collectively to the power supply device 110. However, in this case, execution time information indicating which power command value to apply in which control period is also attached and transmitted. In addition, the prediction command values for such power command values become unnecessary.

(13) The power command value illustrated in the foregoing embodiment supposes a power value, but the power command value may also be a value other than a power value (quantifier P) insofar as a power to be discharged or charged with respect to the power supply device 110 may be specified. For example, a technique may be used in which the power value is used the first time only, and thereafter, a rise value or fall value with respect to the previous power value, or in other words the difference (∆P) is specified. Also, it is possible to use a method that treats the state of no charging or discharging in the power supply device 110 as 0, and specifies the difference with respect to the 0 state even on the first time. Additionally, the power command value may also be a normalized power value or difference value (rise value or fall value).

(14) The foregoing embodiment illustrates a configuration in which the receiving unit 101 notifies the processing unit 104 that the power command value has been received. This is conducted to stipulate the timing for generating the prediction command value, but as long as the timing may still be stipulated, the receiving unit 101 may also be configured to not notify the processing unit 104 that the power command value has been received.

For example, the processing unit 104 may generate the prediction command value when activated by a timer. Specifically, the timer may report the start time of each control period to the processing unit 104, and the processing unit 104 may receive the report from the timer, and execute a processing of generating the prediction command value. Additionally, to ensure that the power command value is written to the storage unit 103, the processing unit 104 may receive a report from the timer a predetermined amount of time after the start time of the control period (for example, 0.1 s after, but before the next control period), and execute a process of generating the prediction command value.

(15) In the foregoing embodiment, the management device 100 is configured to alternately transmit the power command value and the prediction command value to the power supply device 110. However, a configuration like the following may also be used. Namely, the prediction command value (t+1) for the control period (t+1) may be generated before the control period (t), and when the power command value (t) for the control period t is received, the power command value (t) and the prediction command value (t+1) may be transmitted at the same time. By transmitting the power command value and the prediction command value for the next control period at the same time, the number of messages to transmit from the management device 100 to the power supply device 110 may be reduced.

Note that in the case of transmitting the power command value and the prediction command value at the same time, when adopting a configuration of receiving successive power command values from the power company 120 as indicated in the foregoing embodiment, the prediction command value (t+1) is generated before the power command value (t) has been received, and thus the prediction command value (t+1) is generated by using prediction command values preceding the power command value (t).

(16) In the foregoing embodiment, the history of power command values is information associating times and power command values. This is to enable the processing unit 104 to suitably select the power command values needed to generate the prediction command value, but power command values may also not be stored in association with times. It is sufficient for the processing unit 104 to be able to recognize which power command value are necessary to generate the prediction command value. For example, power command values may not be associated with times in the case in which the processing unit 104 uses all power command values stored in the storage unit 103 to generate the prediction command value. Also, power command value may not be associated with times when the storage unit 103 is FIFO memory that has a limit on the number of power command values that may be stored, and successively deletes the oldest power command values. Also, power command values may not be associated with times when the processing unit 104 is already able to recognize the order of the addresses where power command values are stored in the storage unit 103.

(17) In the foregoing embodiment, FIGS. 6 and 7 illustrate an example of the management device 100 generating the first standby time and the second standby time in advance. Herein, the timings for a case in which the management device 100 successively generates the first standby time and the second standby time, and the corresponding operation of the power supply device 110, will be described.

First, in the management device 100, the processing in steps S601 and S602 is not executed in the case of successively generating the first standby time and the second standby time.

Instead, the first standby time is computed by the processing unit 104 after the generation of the prediction command value in step S607 or step S612. Subsequently, the generated first standby time is transmitted to the power supply device 110 together with the prediction command value or the distributed prediction command value in step S608 or step S614.

Also, if there is one power supply device 110, the second standby time is computed by the processing unit 104 before the power command value is transmitted in step S605, whereas if there are multiple power supply devices 110, the second standby time is computed by the processing unit 104 after the distributed power command value is generated in step S609. As discussed earlier, when there is one power supply device, the second standby time is 0. Subsequently, the computed second standby time is transmitted to the power supply device 110 together with the power command value or the distributed power command value in step S605 or step S610.

On the other hand, in the power supply device 110, the processing in steps S701 and S702 of FIG. 7 is not executed.

Instead, in step S703, the second standby time received together with the (distributed) power command value is stored in the storage unit 112. For this reason, in step S704 and step S707, the control unit 113 references the newly stored second standby time.

Meanwhile, for the first standby time, in step S706, the first standby time received together with the (distributed) prediction command value is stored in the storage unit 112. For this reason, in step S708, the control unit 113 references the newly stored first standby time.

Such a configuration may be used in the case of successively generating the first standby time and the second standby time. Note that obviously it may be configured so that only one of either the first standby time or the second standby time is successively generated.

Note that in the case of successively generating the first standby time, an optimal first standby time is computed from the data one step before (for example, one hour before), and used in the next step, for example. Also, in the case of successively generating the first standby time, the trend of the most recent power command values may be analyzed, for example, and if the trend is approaching a threshold value of the power supply device 110 (for example, the rated capacity), decision may be made to lengthen the first standby time, for example.

Note that in the case of successively generating the second standby time, the management device 100 additionally transmits the transmission time when transmitting the power command value or the prediction command value, for example. Meanwhile, each power supply device 110 acquires the time when the power command value or the prediction command value is received, computes the difference between the time of receipt and the time of transmission, and successively reports the difference to the management device 100. Consequently, the management device 100 is able to acquire each communication delay time, and is able to decide the second standby time according to the maximum value from among the communication delay times. However, this presupposes that the management device 100 and the power supply device 110 conduct time synchronization. Note that if the maximum value from among the communication delay times exceeds an allowed standby time (for example, for a prediction command value, the time until the next actual power command value is received), the management device 100 may treat the allowed standby time as the second standby time rather than the maximum value from among the communication delay times.

(18) A control program may be made up of program code causing processors such as the management device or power supply device of a power system stabilization system, or various circuits connected to those processors, to execute processing such as the communication-related operations, the process of generating the prediction command value, and the power control processes based on the prediction command value and the power command value (see FIGS. 5 to 7) indicated in the embodiments discussed above. Such a control program may be recorded onto a recording medium, or distributed or circulated via various communication channels or the like. Such a recording medium may be an IC card, hard disk, optical disc, flexible disk, ROM, or the like. The distributed or circulated control program is used by being stored in memory or the like that may be read out by a processor, and by having the processor execute the control program, the various functions illustrated in the embodiments are realized.

(19) The respective functional units of the management device 100 and the power supply device 110 illustrated in the foregoing embodiment may be realized as circuits that exercise the functions, or be realized as a result of one or multiple processors executing a program. Also, the storage battery pack according to the foregoing embodiment may be configured as an integrated circuit (IC), large-scale integration (LSI), or other chip package. The package is used by being built into various devices, and as a result, the various devices realize respective functions such as those indicated in the embodiments.

Note that each function block is typically realized by LSI, that is, a chip. The function blocks may be realized individually as separate chips, or as a single chip that includes some or all function blocks. Although LSI is discussed herein, the circuit integration methodology may also be referred to as IC, system LSI, super LSI, or ultra LSI, depending on the degree of integration. Furthermore, the circuit integration methodology is not limited to LSI, and may also be realized with special-purpose circuits or general-purpose processors. A field-programmable gate array (FPGA) capable of being programmed after fabrication, or a reconfigurable processor whose circuit cell connections and settings may be reconfigured, may also be used.

(20) The foregoing embodiment and the various exemplary modifications indicated by the modifications may also be combined.

<Supplemental Remarks>

Hereinafter, embodiments of a power system stabilization method, a power system stabilization system, and a power supply device according to the present disclosure will be described along with their advantageous effects.

(a) A power system stabilization method according to one aspect of the present disclosure is a power system stabilization method in a power system stabilization system that provides an ancillary service by controlling, via a communication network, one or more power supply devices connected to a power system, the power system stabilization method including: after receiving one power command value requesting execution of the ancillary service from a power control center that monitors the power system, transmitting the one power command value to the power supply device, and causing the power supply device to supply power corresponding to the one power command value to the power system; using past power command values received from the power control center to generate a prediction command value that is a prediction value of a power command value to be transmitted from the power control center next after the one power command value, and transmitting the prediction command value to the power supply device via the communication network; after receiving the next power command value from the power control center, transmitting the next power command value to the power supply device via the communication network; and during a period from when the power supply device receives the prediction command value until the power supply device receives the next power command value, starting a supply of power corresponding to the prediction command value from the power supply device to the power system.

By executing power control based on a prediction command value predicting the next power command value before the power supply device receives the next power command value, the power supply device is able to execute power control that is close to power control based on the original power command value.

Also, as described in the foregoing embodiments, in some cases a communication delay is produced on the communication network between the management device and the power supply device. Consequently, the time until the power supply device receives the power command value transmitted from the power control center is delayed by an amount of time equal to the communication delay. For this reason, the start of FR control by the power supply device is delayed by an amount of time equal to the communication delay with respect to the timing at which the power control center transmits the power command value.

Also, even if the power supply device is unaffected by a communication delay on the communication network and starts power control corresponding to the power command value at the timing at which the power command value was transmitted from the power control center, in some cases the power supply device needs a fixed amount of time until the output power is changed to power corresponding to the power command value.

(b) Accordingly, the power system stabilization method according to the above (a) may also be configured to include transmitting the prediction command value to the power supply device before receiving the next power command value from the power control center, and starting the supply of power corresponding to the next power command value from the power supply device before receiving the next power command value from the power control center.

Consequently, since a supply of power from the power supply device corresponding to the next power command value is started before the next power command value is received from the power control center, the output of the power supply device may be brought close to the next power command value at the timing at which the power control center transmits the next power command value. As a result, the FR control system may be improved over the related art.

(c) The power system stabilization method according to the above (a) or (b) may also be configured to include, after the power supply device receives the next power command value, switching from the prediction command value to the next power command value to supply power to the power system.

Consequently, since the power supply device is switched to the next power command value for output after the power supply device receives the next power command value, the power waveform output from the power supply device and the timing of the change in the output may be brought closer to the next power command value transmitted from the power control center.

(d) The power system stabilization method according to the above (c) may also be configured to include using a prediction confidence of the prediction command value with respect to the power command value to transmit to the power supply device a first standby time that is a standby time from when the power supply device receives the prediction command value until the power supply device starts an exchange of power corresponding to the prediction command value; wherein after the first standby time elapses after the power supply device receives the prediction command value, the power supply device starts an exchange of power corresponding to the prediction command value, and after the power supply device receives the next power command value, the power supply device starts an exchange of power corresponding to the next power command value.

Consequently, by delaying the start of power control based on the prediction command value by an amount of time equal to the first standby time, even in cases in which the prediction of the prediction command value is largely different from the actual power command value, large deviations from the originally desired power control may be prevented, and thus power control that is close to power control based on the original power command value may be executed.

(e) The power system stabilization method according to the above (d) may also be configured so that the prediction confidence is decided on the basis of a trend of variation in the power command value.

By deciding the first standby time on the basis of a prediction angle of the prediction command value with respect to a trend of variation in the power command value, the exchange of power based on the prediction command value may be started at a more suitable timing.

(f) The power system stabilization method according to the above (a)-(e) may also be configured to include, if there exist multiple power supply devices connected via a communication network, generating a distributed prediction command value distributing the generated prediction command value according to performance of the plurality of power supply devices, transmitting the distributed prediction command value to the plurality of power supply devices, and additionally, generating a distributed power command value distributing an actual power command value received from the system operator according to performance of the plurality of power supply devices, and transmitting the distributed power command value to the plurality of power supply devices.

Consequently, the management device is able to control the exchange of power with the power system by each of the plurality of power supply devices, and thus more flexible power control depending on the situation may be realized.

(g) The power system stabilization method according to the above (f) may also be configured to include detecting a communication delay time to the power supply devices; using the detected communication delay time to transmit to the plurality of power supply devices a second standby time that is a standby time from when each power supply device receives the prediction command value or the next power command value until each power supply device starts a supply of power corresponding to the prediction command value or the next power command value; wherein the plurality of power supply devices start a supply of power corresponding to the prediction command value after the first standby time and the second standby time elapse after the plurality of power supply devices receive the prediction command value, and start a supply of power corresponding to the next power command value after the second standby time elapses after the plurality of power supply devices receive the next power command value.

Consequently, since the timing of the start of the exchange of power between the power supply devices and the power system may be started while also accounting for the communication delay times between the management device and the power supply devices, the exchange of power with the power system may be started more suitably.

(h) The power system stabilization method according to the above (g) may also be configured to include deciding the second standby time by using a maximum value of the communication delay time to each of the plurality of power supply devices on the communication network.

Consequently, even when there are a plurality of power supply devices, the communication delay time between each of the plurality of power supply devices and the management device may be used to qualitatively compute the second standby time.

(i) In the power system stabilization method according to the above (a), the power control center may also be a system operating company.

(j) A power system stabilization system according to the present disclosure is a power system stabilization system including one or more power supply devices connected to a power system, and a management device connected to the one or more power supply devices via a communication network, including: the management device, after receiving one power command value requesting execution of an ancillary service from a power control center that monitors the power system, transmits the one power command value to the power supply device via the communication network; using past power command values received from the power control center to generate a prediction command value that is a prediction value of a power command value to be transmitted from the power control center next after the one power command value, and transmitting the prediction command value to the power supply device via the communication network; and after receiving the next power command value from the power control center, transmitting the next power command value to the power supply device via the communication network; and the power supply device supplying power corresponding to the one power command value received from the management device to the power system, and during a period until the power supply device receives the next power command value from the management device, starting a supply of power corresponding to the prediction command value received from the management device to the power system.

By executing power control based on a prediction command value predicting the next power command value before the power supply device receives the next power command value, the power supply device of the power system stabilization system is able to execute power control that is close to power control based on the original power command value.

(k) The power system stabilization system according to the above (j) may also be configured to include: the management device additionally, on the basis of a prediction confidence of the prediction command value, deciding a first standby time that is a standby time from when the power supply device receives the prediction command value until the power supply device starts an exchange of power corresponding to the prediction command value, and transmits the first standby time to the one or more power supply devices; and the power supply device receiving the one or more standby times; and after the first standby time elapses after the power supply device receives the prediction command value, starting a supply of power corresponding to the prediction command value, and after the power supply device receives the next power command value, starting a supply of power corresponding to the next power command value.

Consequently, by delaying the start of power control based on the prediction command value by an amount of time equal to the first standby time, even in cases in which the prediction of the prediction command value is largely different from the actual power command value, large deviations from the originally desired power control may be prevented, and thus power control that is close to power control based on the original power command value may be executed.

(l) The power system stabilization system according to the above (j) may also be configured so that the first standby time is decided according to the prediction confidence computed according to a trend of variation in the power command value.

By deciding the first standby time on the basis of a prediction angle of the prediction command value with respect to a trend of variation in the power command value, the exchange of power based on the prediction command value may be started at a more suitable timing.

(m) The power system stabilization system according to the above (j)-(l) may also be configured so that, if a plurality of power supply devices connected to the management device via a communication network exist, the processing unit additionally generates a distributed prediction command value distributing the generated prediction command value among the plurality of power supply devices, and generates a distributed power command value distributing the actual power command value to the plurality of power supply devices; and the transmitting unit additionally transmits each distributed prediction command value to each of the plurality of power supply devices as the prediction command value, and transmits the distributed power command value as the power command value.

Consequently, the management device is able to control the exchange of power with the power system by each of the plurality of power supply devices, and thus more flexible power control depending on the situation may be realized.

(n) The power system stabilization system according to the above (m) may also be configured so that the processing unit additionally, at least once, on the basis of a communication delay time between the management device and each power supply device, decides a second standby time that is a standby time from when each power supply device receives the prediction command value or the actual power command value until each power supply device starts an exchange of power corresponding to the prediction command value or the actual power command value, the transmitting unit additionally transmits the second standby time to the plurality of power supply devices, and the power control unit in each of the plurality of power supply devices starts an exchange of power corresponding to the prediction command value after the first standby time and the second standby time elapses after receiving the prediction command value, and starts an exchange of power corresponding to the actual power command value after the second standby time elapses after receiving the actual power command value.

Consequently, since the timing of the start of the exchange of power between a power supply device and the power system may be started while also accounting for the communication delay time between the management device and the power supply device, the exchange of power with the power system may be started more suitably.

(o) In the power system stabilization system according to the above (n), the second standby time may be decided according to a maximum value from among the communication delay times between the management device and each of the plurality of power supply devices on the communication network.

Consequently, even when there are a plurality of power supply devices, the communication delay time between each of the plurality of power supply devices and the management device may be used to qualitatively compute the second standby time.

(p) A power supply device according to the present disclosure is a power supply device connected to a power system, comprising: a power supply that supplies power to the power system; a communication unit that, via a communication network, receives one power command value requesting execution of an ancillary service transmitted from a power control center that monitors the power system; and a power supply control unit that supplies the power system with power from the power supply corresponding to the one power command value received by the communication unit, and during a period until the communication unit receives a next power command value transmitted from the power control center, starts supplying the power system with power from the power supply corresponding to a prediction command value that the communication unit received from the power control center, the prediction command value being a prediction value of a power command value to be transmitted next after the one power command value from the power control center.

By executing power control based on a prediction command value predicting the next power command value before the power supply device receives the next power command value, the power supply device is able to execute power control that is close to power control based on the original power command value.

(q) The power supply device according to the above (p) may also be configured so that the communication unit receives the prediction command value before the power control center transmits the next power command value, and the power supply control unit starts the supply of power corresponding to the prediction command value before the power control center transmits the next power command value.

Consequently, since a supply of power from the power supply device corresponding to the next power command value is started before the next power command value transmitted from the power control center is received, the output of the power supply device may be brought close to the next power command value at the timing at which the power control center transmits the next power command value. As a result, the FR control system may be improved over the related art.

(r) The power supply device according to the above (p) or (q) may also be configured so that, after the next power command value is received, the power supply control unit switches from the prediction command value to the next power command value to supply power from the power supply to the power system.

Consequently, the power waveform output from the power supply device and the timing of the change in the output may be brought closer to the next power command value transmitted from the power control center.

(s) The power supply device according to the above (p)-(r) may also be configured so that the power supply device is a battery system equipped with a battery, and the power supply control unit causes the battery to charge or discharge power corresponding to the power command value.

(s) A power system stabilization method according to the present disclosure may be applied as a method of suitably stabilizing a power system by causing a power supply device to execute discharging or charging according to a power command value from a power control center.

A power system stabilization method according to one aspect of the present disclosure is a power system stabilization method including: receiving a power command value from a power control center that monitors a power system; transmitting the power command value to a power supply device; causing the power supply device to supply power to the power system according to the power command value; generating a prediction command value according to past power command values received from the power control center, the prediction command value being a prediction value of a power command value to be transmitted from the power control center next after the power command value; transmitting the prediction command value to a power supply device; causing the power supply device to supply power to the power system according to the power prediction command value; receiving the next power command value from the power control center; transmitting the next power command value to the power supply device.

For example, the power system stabilization method causes the power supply device to supply power to the power system according to the next power command value after receiving the next power command value.

For example, the power system stabilization method include: determining a first standby time according to a prediction confidence of the prediction command value, the first standby time being a standby time from when the power supply device receives the prediction command value until the power supply device starts an exchange of power corresponding to the prediction command value; and transmitting the first standby time to the power supply device, wherein after the first standby time elapses after the power supply device receives the prediction command value, the power supply device starts an exchange of power corresponding to the prediction command value, and after the power supply device receives the next power command value, the power supply device starts an exchange of power corresponding to the next power command value.

For example, the power system stabilization method include: the power system stabilization method according to claim 3, further comprising determining the prediction angle on the basis of a trend of variation indicated by past power command values received from the power control center.

For example, the power system stabilization method include: generating a distributed prediction command value distributing the generated prediction command value according to performance of power supply devices; transmitting the distributed prediction command value to the power supply devices; generating a distributed power command value distributing an actual power command value received from the power control center according to performance of the power supply devices; and transmitting the distributed power command value to the power supply devices.

For example, the power system stabilization method includes: generating a distributed prediction command value distributing the generated prediction command value according to performance of power supply devices; transmitting the distributed prediction command value to the power supply devices; generating a distributed power command value distributing an actual power command value received from the power control center according to performance of the power supply devices; and transmitting the distributed power command value to the power supply devices detecting a communication delay time to each power supply device; determining a second standby time according to the detected delay time, the second standby time being a standby time from when the power supply device receives the prediction command value or the next power command value until the power supply device starts an exchange of power corresponding to the prediction command value or the next power command value; and transmitting the first standby time to the power supply device, wherein after the first standby time and the second standby time elapses after the power supply device receives the prediction command value, the power supply device starts an exchange of power corresponding to the prediction command value, and after the second standby time elapses after the power supply device receives the next power command value, the power supply device starts an exchange of power corresponding to the next power command value.

For example, the power system stabilization method includes: determining the second standby time by using a maximum value of the communication delay time to each of the power supply devices.

For example, the power control center is a system operating company.

For example, a power system stabilization system to one aspect of the present disclosure includes: one or more memories; and circuitry operative to: receive a power command value from a power control center that monitors a power system; transmit the power command value to a power supply device; cause the power supply device to supply power to the power system according to the power command value; generate a prediction command value according to past power command values received from the power control center, the prediction command value being a prediction value of a power command value to be transmitted from the power control center next after the power command value; transmit the prediction command value to a power supply device; cause the power supply device to supply power to the power system according to the power prediction command value; receive the next power command value from the power control center; transmit the next power command value to the power supply device.

What is claimed is:

1. A power system stabilization method comprising:
transmitting a first standby time to a power supply device,
receiving a power command value from a power control center that monitors a power system;
transmitting the power command value to the power supply device;
causing the power supply device to supply power to the power system according to the power command value;
generating a prediction command value according to past power command values received from the power control center, the prediction command value being a prediction value of a power command value to be transmitted from the power control center next after the power command value; and
transmitting the prediction command value to the power supply device;

wherein the first standby time is a time period from when the power supply device receives the prediction command value until the power supply device starts an exchange of power corresponding to the prediction command value;
wherein the first standby time is increased by a first predetermined value, when a prediction confidence of the prediction command value is at a first level,
the first standby time is maintained when the prediction confidence of the prediction command value is at a second level, and
the first standby time is decreased by a second predetermined value, when the predication confidence of the prediction command value is at a third level,
wherein high-frequency components of power command value of the second level is between the high-frequency components of power command value of the first level and the high-frequency components of power command value of the third level; and
wherein, upon elapse of the first standby time after the power supply device receives the prediction command value, the power supply device starts an exchange of power corresponding to the prediction command value, and after the power supply device receives a next power command value, the power supply device starts an exchange of power corresponding to the next power command value.

2. The power system stabilization method according to claim 1, further comprising determining the prediction confidence on the basis of a trend of variation indicated by the past power command values received from the power control center.

3. The power system stabilization method according to claim 1, further comprising:
generating a distributed prediction command value distributing the generated prediction command value according to performance of power supply devices;
transmitting the distributed prediction command value to the power supply devices;
generating a distributed power command value distributing an actual power command value received from the power control center according to performance of the power supply devices; and
transmitting the distributed power command value to the power supply devices.

4. The power system stabilization method according to claim 3, further comprising:
detecting a communication delay time to each power supply device;
determining a second standby time according to the detected communication delay time, the second standby time being a time period from when the power supply device receives the prediction command value or the next power command value until the power supply device starts an exchange of power corresponding to the prediction command value or the next power command value; and
transmitting the second standby time to the power supply device,
wherein, upon elapse of the first standby time and the second standby time after the power supply device receives the prediction command value, the power supply device starts an exchange of power corresponding to the prediction command value, and, upon elapse of the second standby time after the power supply device receives the next power command value, the power supply device starts an exchange of power corresponding to the next power command value.

5. The power system stabilization method according to claim 4, comprising determining the second standby time by using a maximum value of the communication delay time to each of the power supply devices.

6. A power system stabilization system comprising:
one or more memories; and circuitry operative to:
transmit a first standby time to a power supply device,
receive a power command value from a power control center that monitors a power system;
transmit the power command value to a power supply device;
cause the power supply device to supply power to the power system according to the power command value;
generate a prediction command value according to past power command values received from the power control center, the prediction command value being a prediction value of a power command value to be transmitted from the power control center next after the power command value;
transmit the prediction command value to a power supply device;
wherein the first standby time is a time period from when the power supply device receives the prediction command value until the power supply device starts an exchange of power corresponding to the prediction command value;
wherein the first standby time is increased by a first predetermined value, when a prediction confidence of the prediction command value is at a first level,
the first standby time is maintained when the prediction confidence of the prediction command value is at a second level, and
the first standby time is decreased by a second predetermined value, when the predication confidence of the prediction command value is at a third level,
wherein high-frequency components of power command value of the second level is between the high-frequency components of power command value of the first level and the high-frequency components of power command value of the third level; and
wherein, upon elapse of the first standby time after the power supply device receives the prediction command value, the power supply device starts an exchange of power corresponding to the prediction command value, and after the power supply device receives a next power command value, the power supply device starts an exchange of power corresponding to the next power command value.

7. The power system stabilization method according to claim 1, wherein the prediction confidence is determined on the basis of the high-frequency components indicated by past power command values received from the power control center.

8. The power system stabilization method according to claim 7, wherein the prediction confidence is further determined on the basis of at least one of climate, atmospheric temperature, weather or holidays.

9. The power system stabilization method according to claim 7, wherein
the prediction confidence is at the third level, when the high-frequency components are fewer than the high-frequency components of the second level, and
the prediction confidence is at the first level, when the high-frequency components are more than the high-frequency components of the second level.

10. The power system stabilization method according to claim 7, wherein a table, indicating a relationship between a plurality of prediction confidence levels, including the first, second and third levels, and a plurality of first standby times, is stored in a memory,
the table associates the high-frequency components of each prediction confidence level, of the plurality of prediction confidence levels, with a corresponding first standby time,
the method further comprises obtaining the first standby time from the table based on the high frequency components of the past power command values.

* * * * *